United States Patent [19]

Miyagawa et al.

[11] Patent Number: 6,064,892
[45] Date of Patent: May 16, 2000

[54] TRAFFIC MANAGEMENT SYSTEM WITH OVERLOAD CONTROL FUNCTIONS FOR USE IN A TELECOMMUNICATIONS SYSTEM

[75] Inventors: Norimasa Miyagawa; Takaaki Kawakami, both of Kawasaki, Japan

[73] Assignee: Fujitsu Limited, Kanagawa, Japan

[21] Appl. No.: 08/844,372

[22] Filed: Apr. 18, 1997

[30] Foreign Application Priority Data

Sep. 17, 1996 [JP] Japan ................................ 8-244854
Jan. 21, 1997 [JP] Japan ................................ 9-008583

[51] Int. Cl.[7] .................................................. H04B 1/38
[52] U.S. Cl. ...................................... 455/560; 455/67.1
[58] Field of Search .................................. 455/561, 560, 455/67.1, 423, 453, 528

[56] References Cited

U.S. PATENT DOCUMENTS 5,293,641 3/1994 Kallin et al. ................................ 455/63
5,765,108 6/1998 Martin et al. .............................. 455/422

FOREIGN PATENT DOCUMENTS 60-84058 5/1985 Japan .
1-149622 6/1989 Japan .

*Primary Examiner*—Nguyen Vo
*Assistant Examiner*—Darnell R. Armstrong
*Attorney, Agent, or Firm*—Helfgott & Karas, P C.

[57] ABSTRACT

A traffic management system with overload control functions which deals with traffic congestion happened in a particular coverage area as part of a telecommunications network system. The traffic management system comprises two main units: an overload controller and a call restriction processor. The overload controller identifies the coverage area in a high-traffic condition and activates the call restriction processor deployed in the identified area. Under the control of the overload controller, the call restriction processor regulates the acceptance of calls from subscribers within the area. To provide such overload control functions, the overload controller comprises the following processors. An originating call analysis processor analyzes each originating call to locate the coverage area where the call setup request was initiated. A call-restricted area search processor determines whether to designate the originating coverage area as a call-restricted coverage area which is subject to call restriction. A restriction control message processor sends a restriction control message that specifies an operation to be executed by the call restriction processor.

15 Claims, 37 Drawing Sheets

|   | 7 | 6 | 5 | 4 | 3 | 2 | 1 | 0 |
|---|---|---|---|---|---|---|---|---|
| 0 | Message Type |||||||| 
| 1 | Element Identifier ||||||||
| 2 | Length ||||||||
| 3 | ext ||| Cause Value |||||
| 4 | Element Identifier ||||||||
| 5 | Length ||||||||
| 6 | Spare |||| ext ||||
| 7 | MCC dig2 |||| MCC dig1 ||||
| 8 | 1 1 1 1 |||| MCC dig3 ||||
| 9 | MNC dig2 |||| MNC dig1 ||||
| 10 | LAC ||||||||
| 11 | LAC cont. ||||||||
| 12 | CI value ||||||||
| 13 | CI value cont. ||||||||

FIG. 28

| Bit | 7 | 6 | 5 | 4 | 3 | 2 | 1 | 0 |
|---|---|---|---|---|---|---|---|---|
| 0 | \multicolumn{8}{c|}{Message Type} |||||||||
| 1 | Element Identifier |||||||||
| 2 | Length |||||||||
| 3 | Spare |||| ext ||||
| 4 | MCC dig2 |||| MCC dig1 ||||
| 5 | 1 1 1 1 |||| MCC dig3 ||||
| 6 | MNC dig2 |||| MNC dig1 ||||
| 7 | LAC |||||||||
| 8 | LAC cont. |||||||||
| 9 | CI value |||||||||
| 10 | CI value cont. |||||||||

FIG. 29

TRAFFIC MANAGEMENT SYSTEM WITH OVERLOAD CONTROL FUNCTIONS FOR USE IN A TELECOMMUNICATIONS SYSTEM

BACKGROUND OF THE INVENTION

1. Field of the Invention

The present invention relates to a traffic management system with overload control functions for use in a telecommunications system, and more particularly, to a traffic management system which controls overload in call handling process in high-traffic conditions.

2. Description of the Related Art

In telecommunications systems, too many calls concentrated in a particular switching station or communications channel would cause an overload, and it could drive the network system into an abnormal condition where any new call requests from subscribers cannot be accepted; or the system is congested. Once such congestion has occurred, some impatient subscribers will repeat calling over and over until the connection is reached. Such subscribers' behavior will further increase the frequency of call handling processes executed in switching equipment, which, however, would mostly end up in vain. This leads to significant performance degradation in call connection services, and therefore, appropriate traffic management and congestion control are necessary so that the system will keep the quality grade required in telecommunications services.

FIG. 35 is a block diagram showing a telecommunications system where mobile communications networks are connected to a switching station of a general public telephone network. To provide mobile communication services in different geographical locations, the system comprises a plurality of radio port coverage areas (or cell, in cellular radio terminology) CI1 to CI3, which are served by base transceiver stations (BTSs) 91 to 93, respectively. Mobile stations (MSs) are distributed in those cells CI1 to CI3. The BTSs 91 to 93 are under the control of base station controllers (BSCs) 81 and 82, which are connected to a switching station 400 serving as a gateway to fixed public networks via digital trunks (DTs) 50a to 50d which monitor trunk circuit signals. The switching station 400 comprises a call processor (CPR) 401 and a main processor (MPR) 402. Further detailed explanation will not be presented here, since FIG. 35 is only for the purpose of showing the ideas of traffic condition in a mobile radio system. The distribution of active mobile stations is not uniform. FIG. 35 indicates this irregularity of distribution by different densities of mobile stations as illustrated in each coverage area CI1, CI2, or CI3. That is, the coverage area CI2 including the largest number of mobile stations is considered to be in a high-traffic condition.

FIG. 36 shows the load distribution in call handling processes performed by the CPR 401 with respect to the BSCs 81 and 83. Because the BSC 82 suffered from much heavier traffic than the BSC 81 due to the high population in the coverage area C12, most of its processor performance is spent for call handling of the BSC 82.

The first-mentioned network congestion sometimes occurs in such a situation that some disaster struck a certain region in a country and people in other distant areas are anxious about their friends or relatives living in that region. When an extraordinary increase of network traffic is observed in a particular area, it will be necessary to restrict the calls entering to the network to avoid congestion.

FIG. 37 is a conceptual view of a conventional call restriction method to restrict incoming calls to a telecommunications network system.

[S1] Call setup requests from mobile stations reach the CPR 401 via the BSC 82 and accepted by a call handling process 401a that is integrated therein.

[S2] The call handling process 401a inquires of a call restriction process 401b, another integral part of the CPR 401, whether any level of call restriction should be applied or not. The call restriction process 401b always monitors the traffic conditions by performing a central controller (CC) usage rate analysis 401c and transaction rate analysis 401d, and it responds to the inquiry from the call handling process 401a based on those analyses.

[S3] When the call restriction process 401b decided to execute some call restriction, it notifies the call handling process 401a that an n-percent call restriction should be applied. This n-percent call restriction means that the call handling process 401a will reject n-percent of call requests while accepting the rest of them. When a 50 percent restriction, for example, is effective, one of two calls will be connected and the other will not be connected.

[S4] Upon receipt of the notification, the call handling process 401a applies the n-percent call restriction to all the BSCs under the control of the CPR 401. More specifically, in FIGS. 35 and 37, the CPR 401 conducts the n-percent call restriction with respect to the two BSCs 81 and 82.

As described above, the conventional call restriction method implemented in a CPR applies the same call restriction process equally to all BSCs connected to the CPR, without considering individual call processing load that may differ from BSC to BSC. The above conventional method, therefore, produces adverse side effects on the grade of total communication services since the call restriction process will also affect activities of other BSCs in low-traffic conditions.

SUMMARY OF THE INVENTION

Taking the above into consideration, an object of the present invention is to provide a traffic management system with overload control functions which will apply a call restriction process only to a particular area in a high-traffic condition.

To accomplish the above object, according to the present invention, there is provided a traffic management system with overload control functions which controls traffic congestion happened in a telecommunications system.

The traffic management system comprises two main parts: overload controlling means and call restriction processing means. The overload controlling means analyzes the traffic condition in response to each call setup request, and sends appropriate messages to prompt the call restriction processing means to execute call restriction.

For this purpose, the overload controlling means comprises the following elements. First, originating call analysis processing means analyzes each call setup request so as to locate an originating coverage area where the call setup request was initiated. Second, call-restricted area search processing means determines whether the originating coverage area should be designated as a call-restricted coverage area or not. Here, the call-restricted coverage area is an area subject to call restriction. Third, restriction control message processing means sends a restriction control message to designate a specific operation to be executed for the call restriction. In response to this restriction control message, the call restriction processing means executes the designated operation to apply the call restriction to the call-restricted coverage area.

The above and other objects, features and advantages of the present invention will become apparent from the fol-

BRIEF DESCRIPTION OF THE DRAWINGS

FIG. 28 is a diagram showing an "OVERLOAD" message format;

FIG. 29 is a diagram showing an "OVERLOAD RESTORATION" message format;

DESCRIPTION OF THE PREFERRED EMBODIMENTS

Several embodiments of the present invention will be described below with reference to the accompanying drawings.

Figure 1:
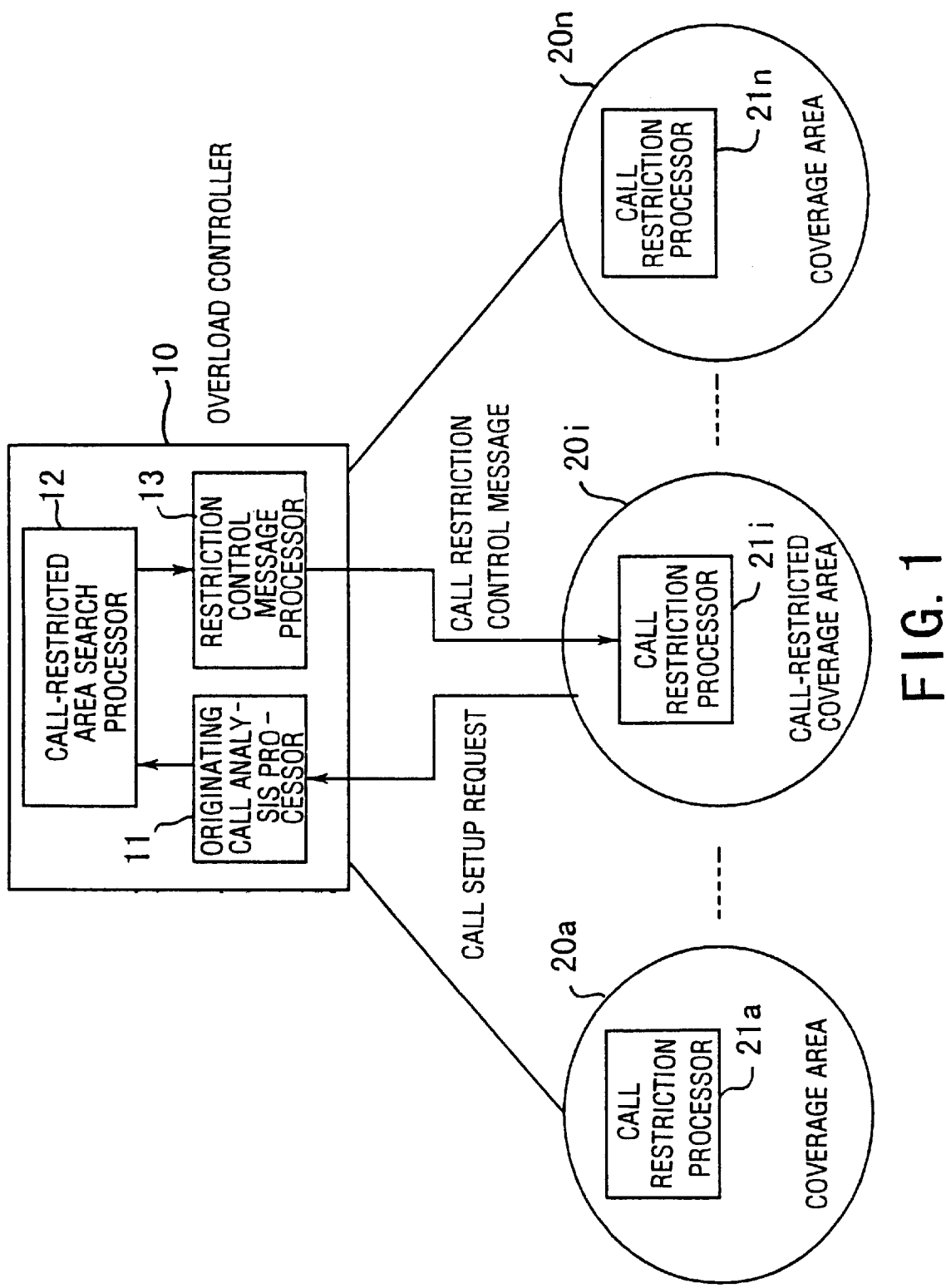
FIG. 1 is a conceptual view of a traffic management system according to the present invention.

FIG. 1 is a conceptual view of a traffic management system according to the present invention. The traffic management system comprises an overload controller 10 and a plurality of coverage areas 20a–20n that include call restriction processors 21a–21n, respectively. The coverage area 20i is in the highest traffic condition among the coverage areas 20a–20n, and thus it is subject to call restriction. That is, the coverage area 20i is regarded as a call-restricted coverage area.

The originating call analysis processor 11 receives calls from mobile stations in the coverage areas 20a–20n and analyzes each call to identify from which coverage area the calls have originated. Here, every coverage area has its own area identification number (or cell identifier, in cellular terminology). The call-restricted area search processor 12 examines whether the identified area is designated as the call-restricted coverage area or not. Assume here that a call setup request was initiated from the coverage area having an identification number 20i and the call-restricted area search processor 12 determined that the area is subject to call restriction.

The restriction control message processor 13 sends restriction control messages to the call restriction processor 21$i$ to indicate what type of operation should be conducted to restrict calls in the coverage area 20$i$. The restriction control messages actually include three kinds of messages: a restriction initiation message to activate a call restriction process, a restriction termination message to terminate or reduce the level of call restriction, and a clear request message to disable unused channel resources necessary for connection. The details of those messages will be separately described later.

With the received restriction control message, the call restriction processor 21$i$ regulates the calls within its coverage area 20$i$.

Figure 2:
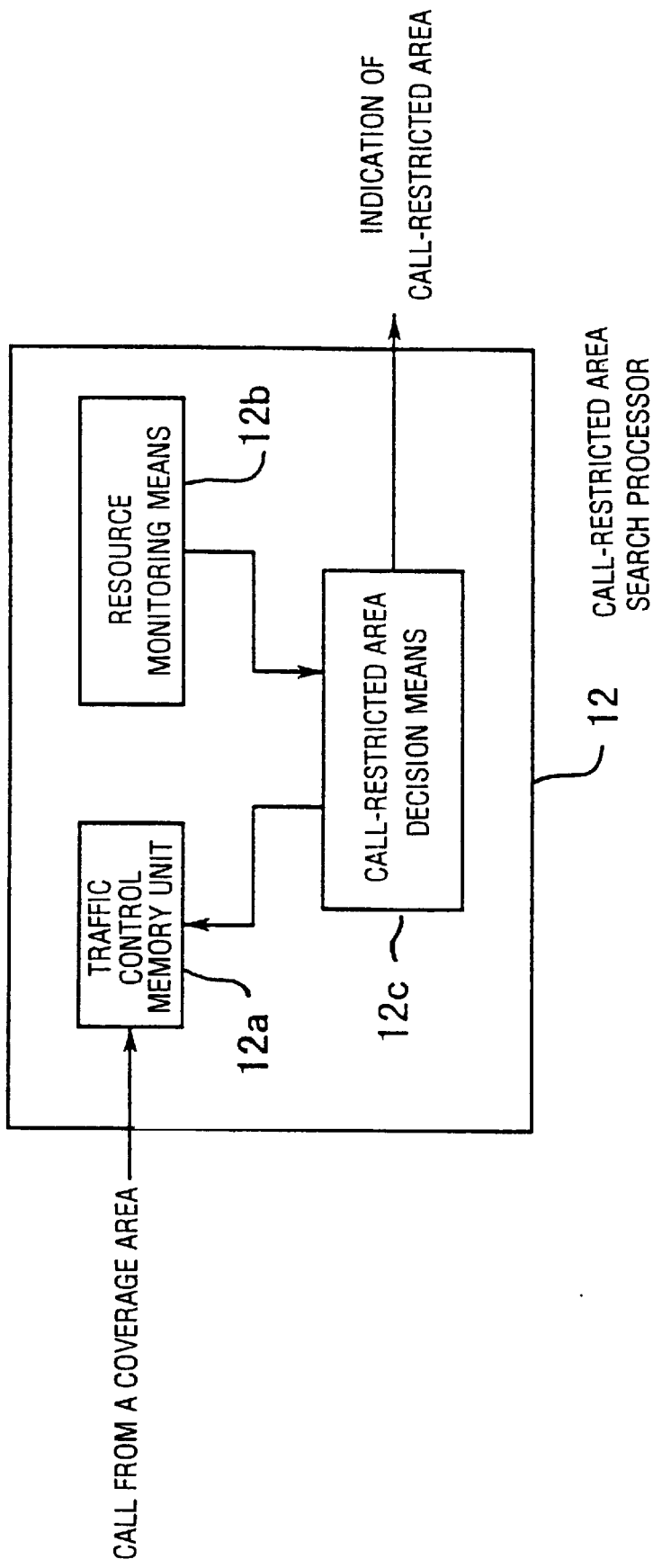
FIG. 2 is a block diagram of a call-restricted area search processor.

FIG. 2 show the structure of the call-restricted area search processor 12. The call-restricted area search processor 12 comprises a traffic control memory unit 12$a$, resource monitoring means 12$b$, and call-restricted area decision means 12$c$.

The traffic control memory unit 12$a$ stores information about the traffic condition of each coverage area which is identified by the originating call analysis processor 11. The resource monitoring means 12$b$ is always monitoring the CC usage rate and transaction usage rate in the CPR. Upon detection of congestion of call handling processes in the CPR, the resource monitoring means 12$b$ notifies the call-restricted area decision means 12$c$ of the congestion.

Being informed of the call handling process congestion, the call-restricted area decision means 12$c$ searches the traffic condition data in the traffic control memory unit 12$a$ to identify the most congested coverage area and determines to restrict the call handling in the identified coverage area. Subsequently to this determination of the call-restricted coverage area, the call-restricted area decision means 12$c$ sends the area identification number of the call-restricted coverage area to the restriction control message processor 13.

Figure 3:
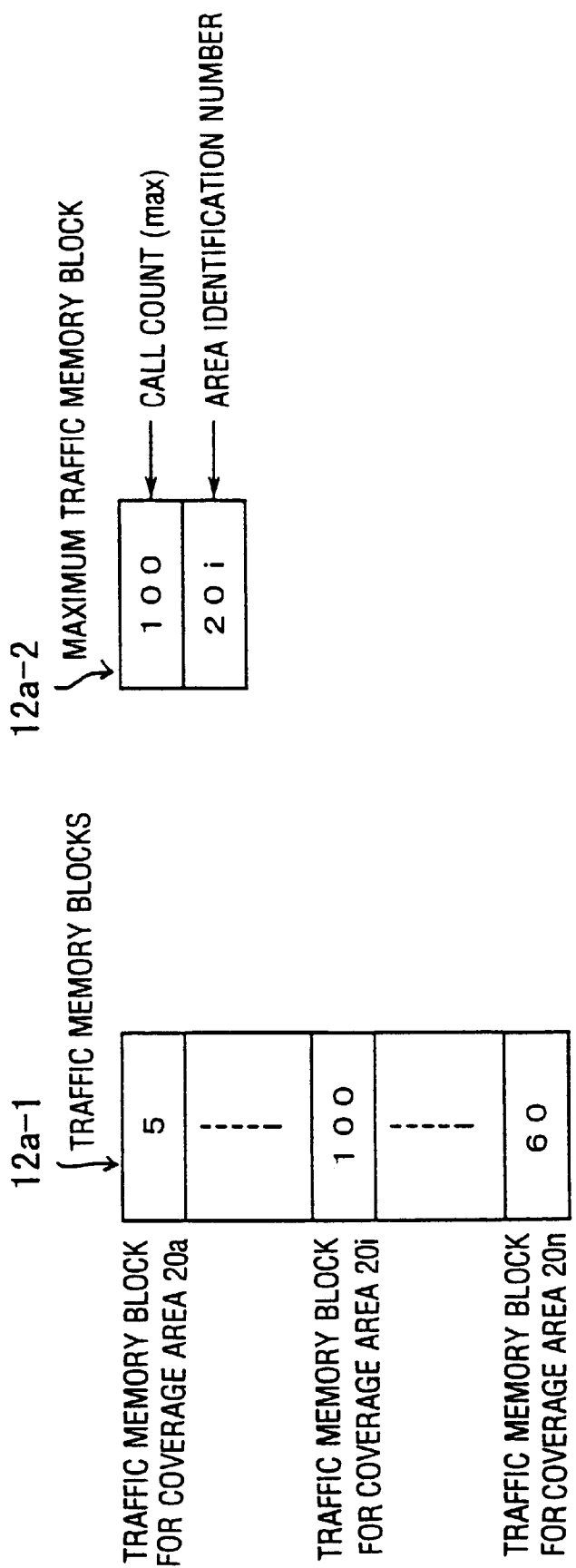
FIGS. 3(A) and 3(B) are block diagrams showing the data structure of a traffic control memory unit.

FIGS. 3(A) and 3(B) show the structure of the traffic control memory unit 12$a$. The traffic control memory unit 12$a$ comprises a plurality of traffic memory blocks corresponding to the coverage areas 20$a$–20$n$ to summarize the present call density status in those areas. More specifically, the traffic control memory unit 12$a$ is broadly divided into two parts: traffic memory blocks 12$a$-1 and a maximum traffic memory block 12$a$-2. The traffic memory blocks 12$a$-1 is a collection of records, each of which stores a call count, i.e., the number of calls in service within a corresponding coverage area. The maximum traffic memory block 12$a$-2 holds the top record among those contained in the traffic memory blocks 12$a$-1. See FIG. 3(A), for example. Call count "100" is recorded in the memory block corresponding to the coverage area 20$i$. Since this call count value is the largest among those contained in the traffic memory blocks 12$a$-1, the maximum traffic memory block 12$a$-2 holds its copy as the maximum call count "100" and also stores the area identification number of this highly populated coverage area 20$i$.

Figure 4:
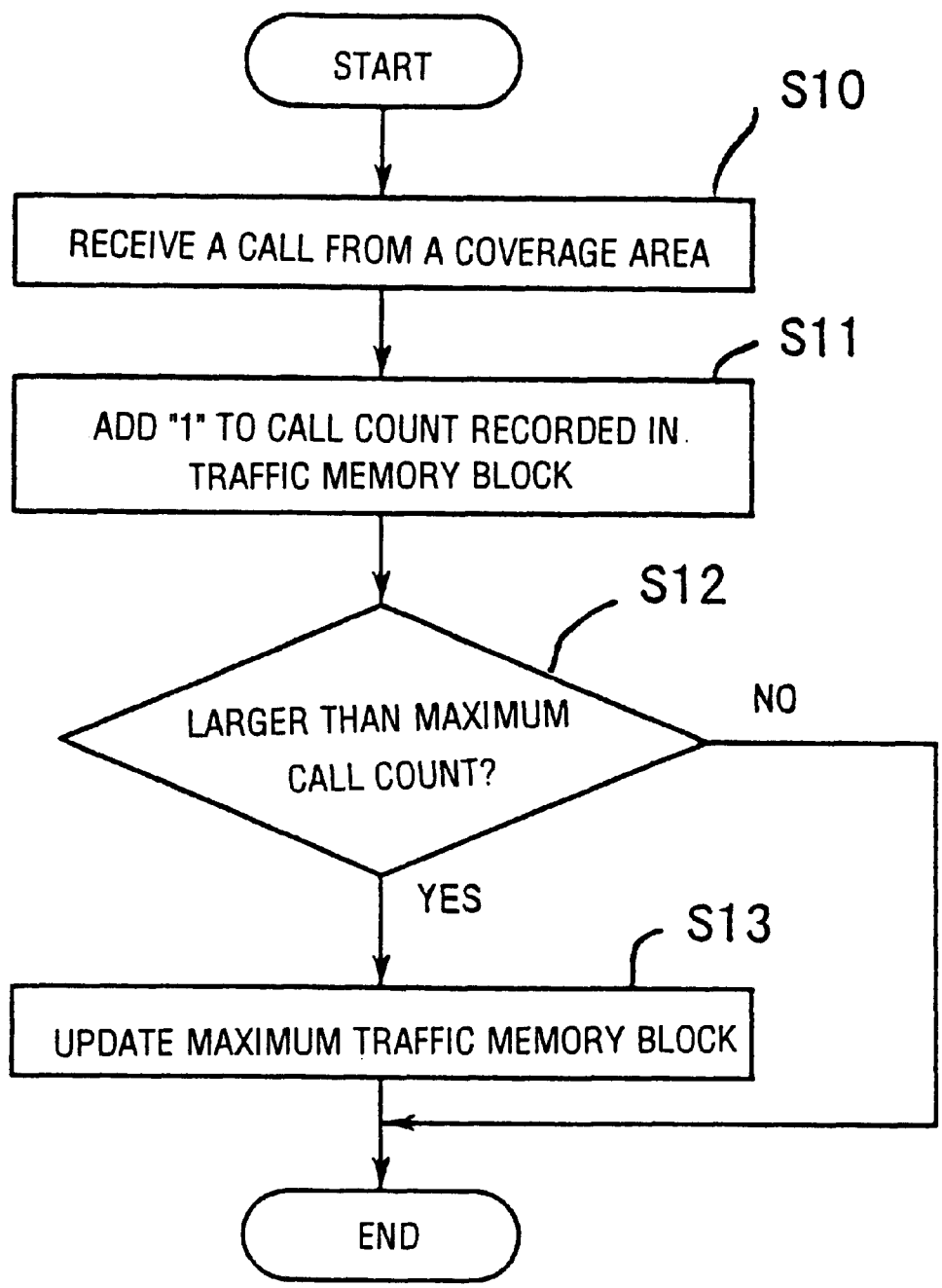
FIG. 4 is a flowchart showing a procedure of updating the traffic memory unit when a new call request is initiated in a certain coverage area.

FIG. 4 is a flowchart showing a procedure of updating the traffic memory unit 12$a$ when a new call request is initiated in a certain coverage area. The updating process comprises the following steps S10–S13.

[S10] The call-restricted area search processor 12 receives an originating call from a certain coverage area.

[S11] The call-restricted area search processor 12 identifies the originating coverage area and then updates a call count stored in the corresponding part of the traffic memory blocks 12$a$-1, by adding "1" to the present count value.

[S12] The call-restricted area decision means 12$c$ determines whether or not the new call count updated in step S11 is greater than the maximum call count stored in the maximum traffic memory block 12$a$-2. If it is greater than the present maximum call count, the process advances to step S13. Otherwise, the process is terminated without updating the maximum traffic memory block 12$a$-2.

[S13] The call-restricted area search processor 12 updates the maximum traffic memory block 12$a$-2 with the new call count of the originating coverage area, which is now regarded as the most congested area.

Figure 5:
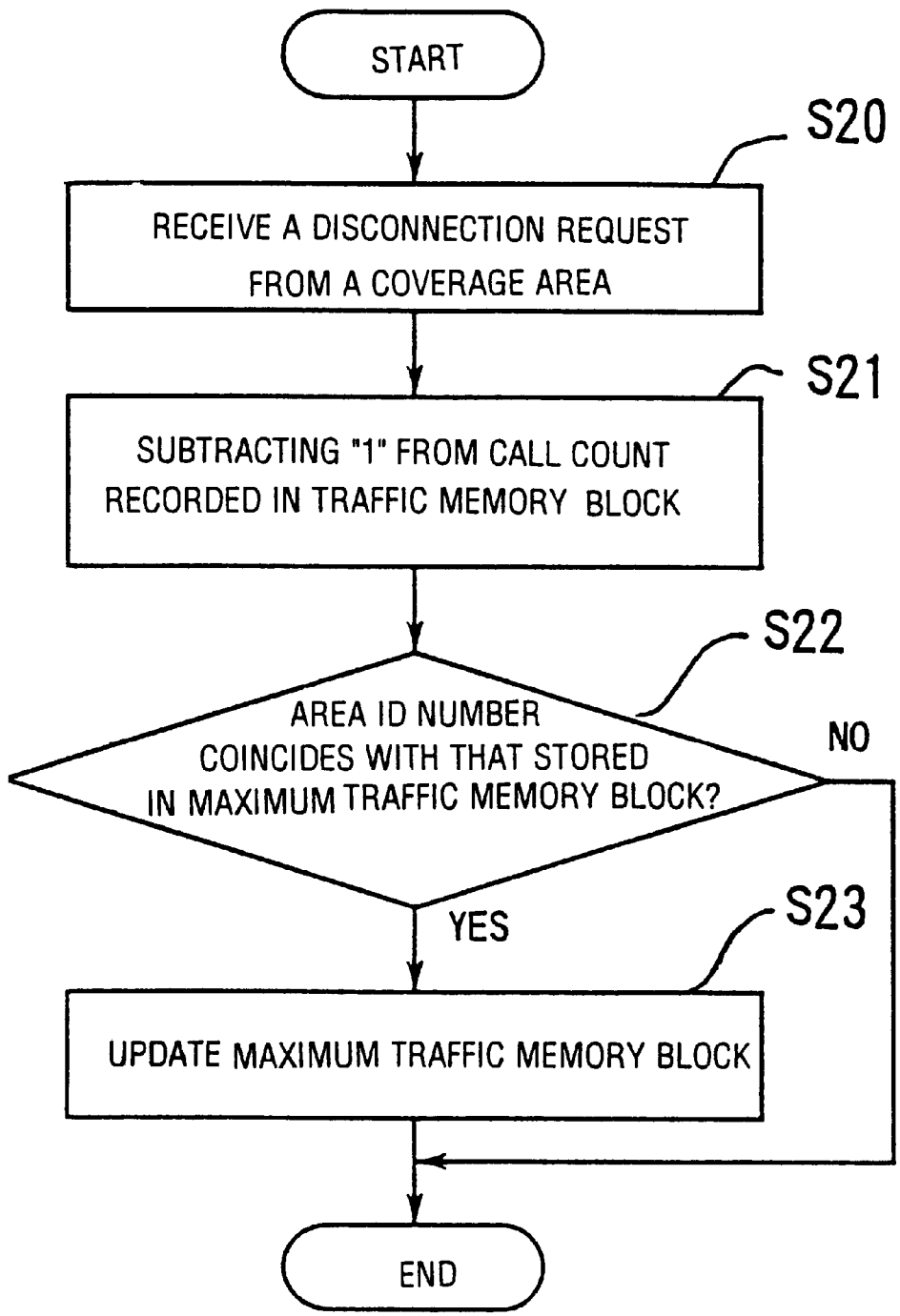
FIG. 5 is a flowchart showing a procedure of updating the traffic memory unit when a disconnection request is initiated in a certain coverage area.

FIG. 5 is a flowchart showing the procedure of updating the traffic memory unit 12$a$ when a disconnect request is initiated by an MS in a certain coverage area. The updating process comprises the following steps S20–S23.

[S20] The call-restricted area search processor 12 receives a disconnection request from a certain coverage area.

[S21] The call-restricted area search processor 12 identifies the requesting coverage area and updates the call count in the corresponding traffic memory block, as part of the traffic memory blocks 12$a$-1, by subtracting "1" from the present count value.

[S22] The call-restricted area decision means 12$c$ examines whether or not the area identification number of the requesting coverage area coincides with that stored in the maximum traffic memory block 12$a$-2. If they agree with each other, the process advances to step S23. Otherwise, the process is terminated without updating the maximum traffic memory block 12$a$-2.

[S23] The maximum call count stored in the maximum traffic memory block 12$a$-2 is replaced with the new count that represents the present number of calls in the requesting coverage area, which was calculated in step S21.

Figure 6:
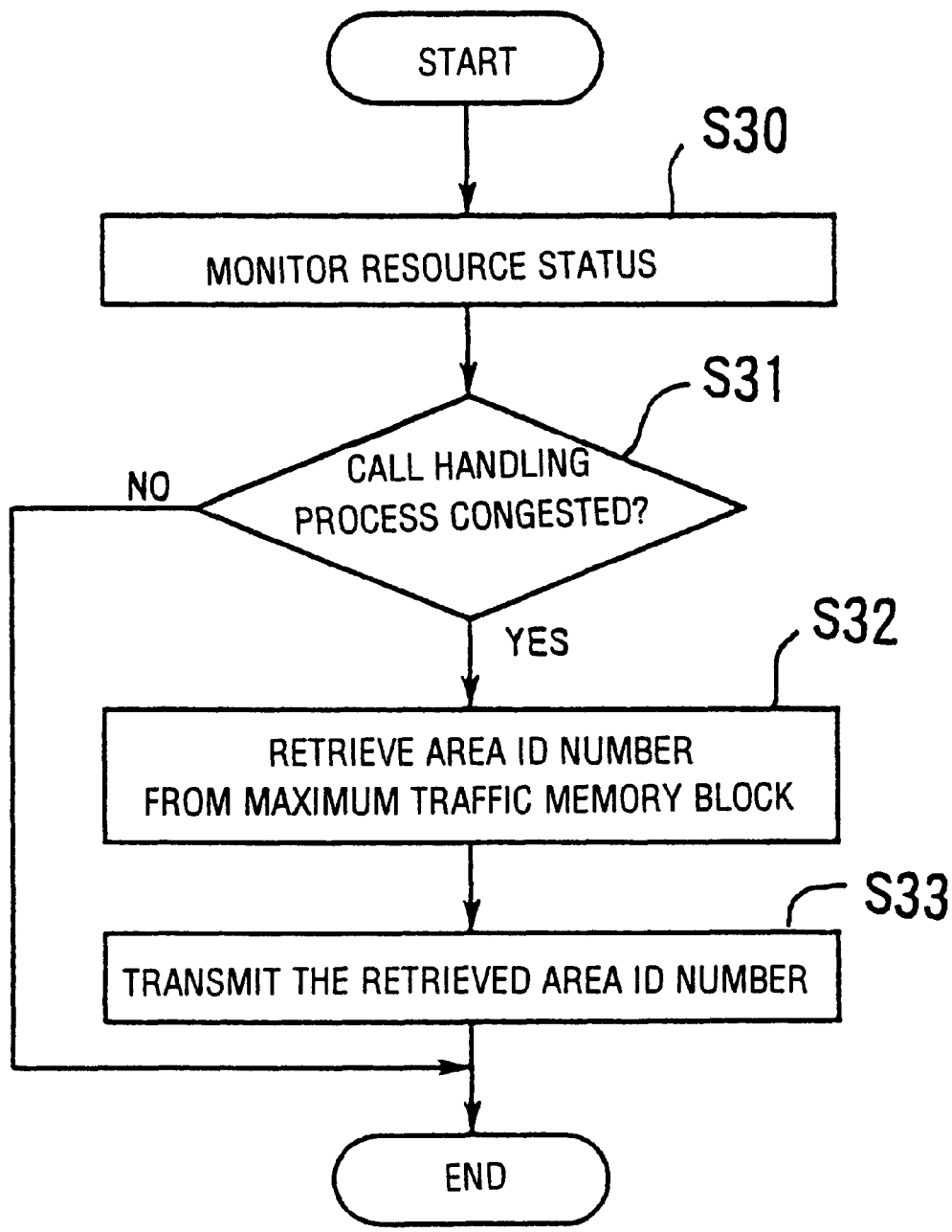
FIG. 6 is a flowchart outlining a procedure executed by a call-restricted area search processor.

FIG. 6 is a flowchart outlining an overall task executed by the call-restricted area search processor 12. The call-restricted area search processor 12 is activated by the operating system (OS) of the switching station at predetermined intervals.

[S30] The resource monitoring means 12$b$ monitors the CC usage rate and transaction usage rate in the CPR, which serve as the measure of busyness of the call handling process.

[S31] When the congestion of call handling process is detected by the resource monitoring means 12$b$, the process advances to step S32. Otherwise, the process is terminated.

[S32] The call-restricted area decision means 12$c$ retrieves the area identification number of the most congested coverage area out of the maximum traffic memory block 12$a$-2.

[S33] The call-restricted area decision means 12$c$ transmits the retrieved area identification number to the restriction control message processor 13.

According to the present invention, the traffic management system locates a high-traffic coverage area by using a traffic control memory unit storing the traffic records of all coverage areas, and applies the call restriction process only to the most congested coverage area. This structural arrangement enables the call restriction to be conducted in a particular coverage area in a high-traffic condition, depending on the call density distribution in the coverage areas. The remaining low-traffic areas are not affected by this call restricting operation.

Figure 7:
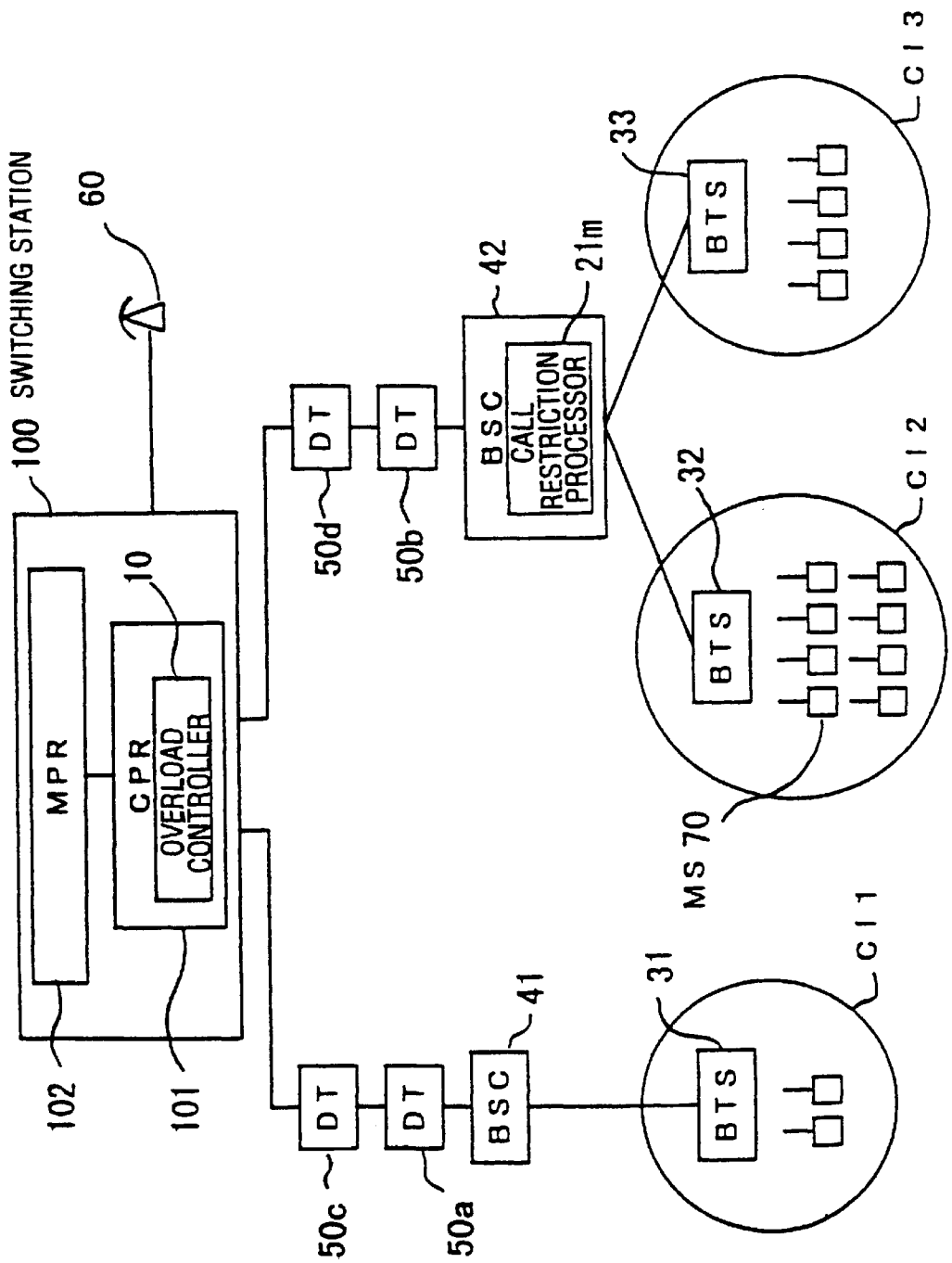
FIG. 7 is a diagram showing a first embodiment of the present invention, where the proposed traffic management system is implemented in a mobile communications network.

Referring next to FIGS. 7 to 12, the following description will present a first embodiment of the present invention, where a first proposed traffic management system is integrated in a mobile communications network. FIG. 7 shows a simple mobile radio system model of the first embodiment. Note that, in this first embodiment, the call restriction processors are installed in base station controllers (BSCs). Also, it is assumed that the radio port coverage area (called "cell," hereafter) CI2 is in a high-traffic condition and, therefore, it will be subjected to the call restriction.

The mobile communications network illustrated in FIG. 7 has three cells CI1–CI3. The cell CI1 contains a base transmit station (BTS) 31 which controls a radio link to the mobile stations (MSs). The BTS 31 is connected to a BSC 41 which manages radio resources for the BTS 31 and handles relevant mobile communications protocol. The BSC 41 is linked to a switching station 100 via digital trunks 50a and 50c.

The cell CI2 includes a BTS 32, which is connected to another BSC 42. Likewise, the cell CI3 includes a BTS 33, which is under the control of the same BSC 42. The BSC 42 manages radio resources for both BTSs 32 and 33 and handles mobile communications protocol. A call restriction processor 21m, serving as an integral part of the BSC 42, executes a call restriction process. The BSC 42 is further connected to the switching station 100 via the digital trunks 50b and 50d.

The switching station 100, working as part of a public switched telephone network, contains a CPR 101 and an MPR 102. The overload controller 10 explained in FIG. 1 is disposed in this CPR 101. An ordinary fixed telephone terminal 60 is connected to the switching station 100 by a wireline link.

Figure 8:
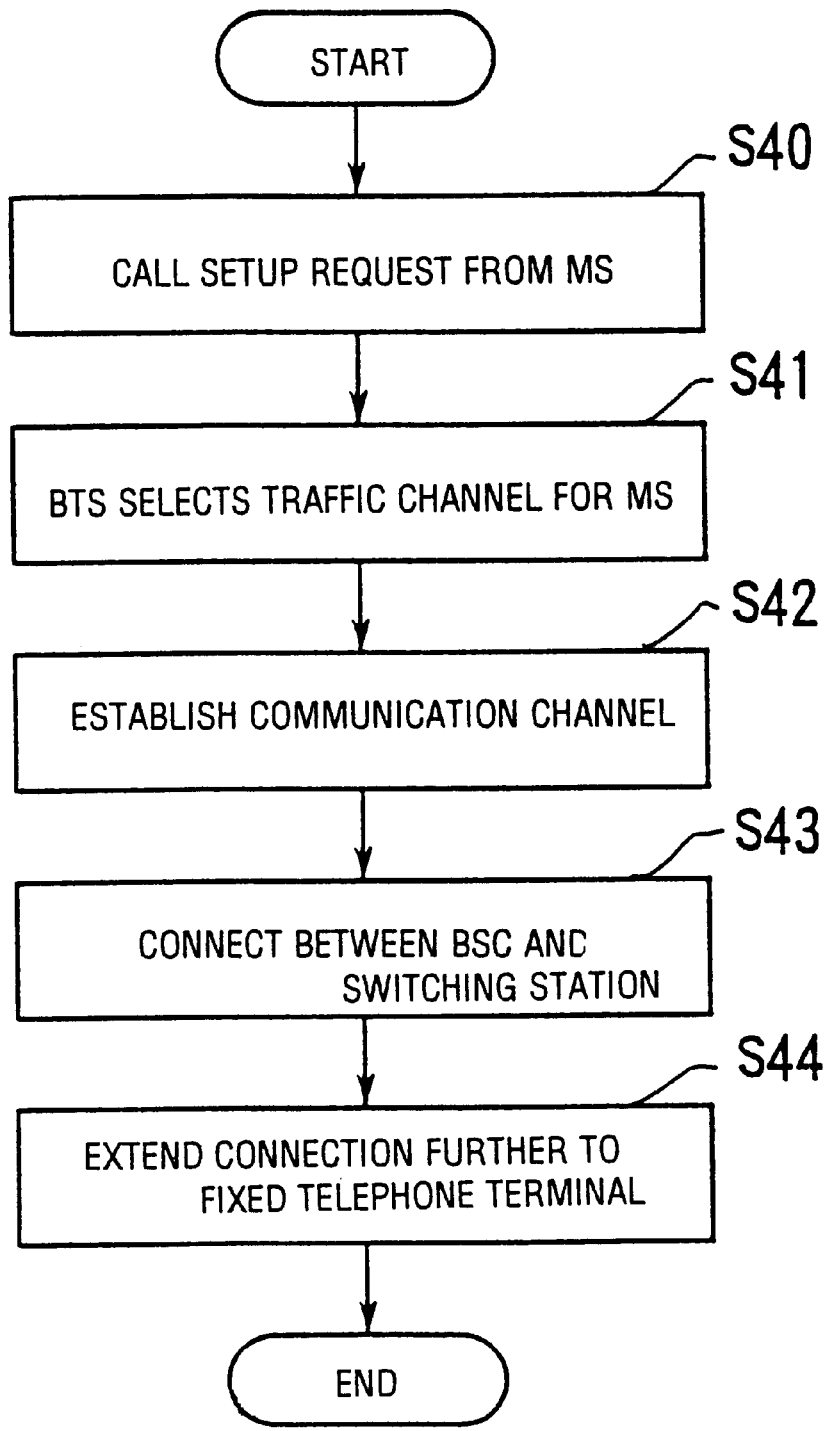
FIG. 8 is a flowchart showing a procedure of call origination from a mobile station to an ordinary fixed telephone terminal.
Figure 9:
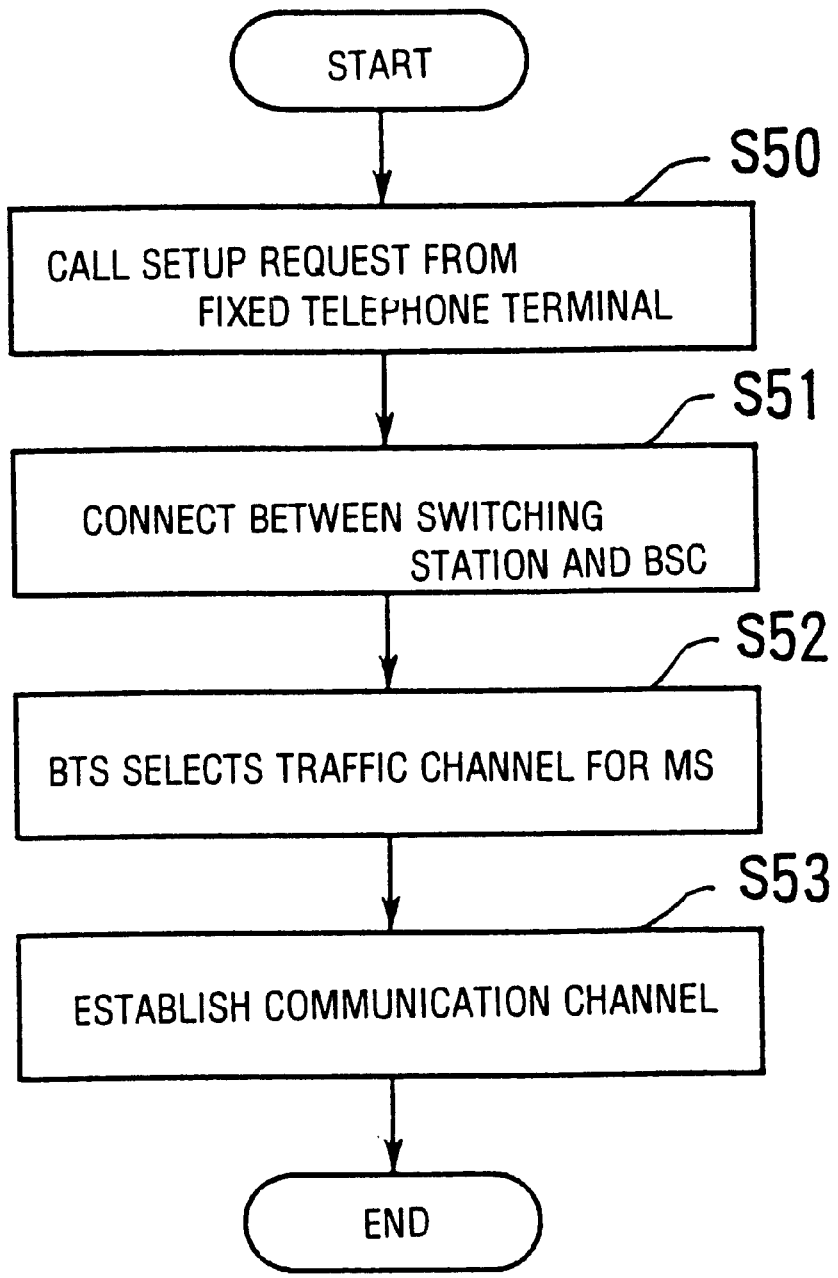
FIG. 9 is a flowchart showing a procedure of handling an incoming call from an ordinary fixed telephone terminal to a mobile station.

With reference to FIGS. 8 and 9, the following description will outline the normal operations, such as handling of originating calls and incoming calls, of the radio communications network illustrated in FIG. 7.

FIG. 8 is a flowchart that outlines a procedure of handling an originating call from an MS 70 to the fixed telephone terminal 60. The process comprises the following steps S40 to S44.

[S40] A call setup request is initiated by the MS 70.

[S41] The BTS 32 selects an unused traffic channel for the call from the MS 70 and notifies the MS 70 of this channel selection, while preparing for the transmission across the selected channel.

[S42] The MS 70 switches its circuit to the notified traffic channel, thereby establishing a channel to communicate with the BTS 32.

[S43] The BSC 42 interacts with the BTS 32 and makes a connection between the MS 70 and switching station 100 so that the call will reach the switching station 100 via the digital trunks 50b and 50d.

[S44] The switching station 100 connects the MS 70 to the called party, i.e., the fixed telephone terminal 60.

FIG. 9 is a flowchart that outlines a procedure of handling an incoming call from the fixed telephone terminal 60 to the MS 70.

[S50] The call initiated by the fixed telephone terminal 60 is connected up to the BSC 42 via the switching station 100 and digital trunks 50d and 50b.

[S51] Knowing that the called MS 70 exists in the cell CI2, the BSC 42 interacts with the BTS 32 and connects the fixed telephone terminal 60 so that the call will reach the BTS 32.

[S52] The BTS 32 assigns an unused traffic channel to the call addressed to the MS 70 and indicates this channel assignment to the MS 70.

[S53] The MS 70 switches its circuit to the notified traffic channel, thereby establishing the end-to-end communication channel. This concludes the connection setup for the incoming call from the fixed telephone terminal 60 to the MS 70.

Referring back to FIG. 7, the following description will present the detailed operation of the proposed traffic management system when a high-traffic condition is produced in a particular cell, say the cell CI2.

From the resource usage information provided by the integral resource monitoring means 12b (FIG. 2), the overload controller 10 learns that the cell CI2 is suffering from high-level traffic. Thus the overload controller 10 transmits a restriction control message to the call restriction processor 21m in the BSC 42 by activating the restriction control message processor 13 (FIG. 1). According to the content of the received restriction control message, the call restriction processor 21m performs call restriction within the cell CI2.

Figure 10:
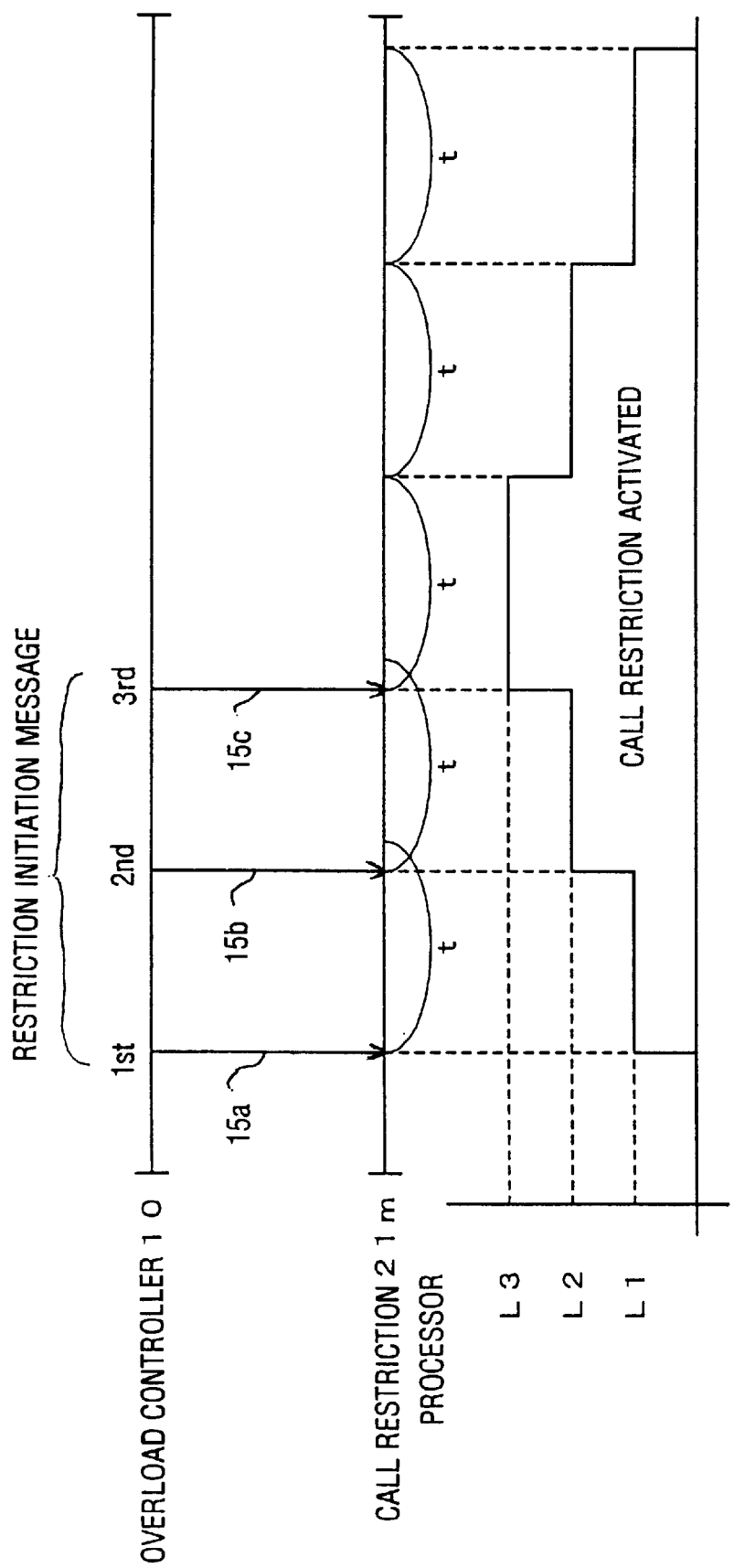
FIG. 10 is a diagram showing how a call restriction processor uses a call restriction timer when executing a call restriction process.

FIG. 10 is a diagram showing how the call restriction processor 21m uses a call restriction timer to execute a call restriction process. The overload controller 10 sends to the BSC 42 a restriction initiation message, which is one of the three kinds of restriction control messages. Upon receipt of the restriction initiation message 15a for the first time, the call restriction processor 21m applies call restriction to the cell CI2 at restriction level L1, which is defined in advance to be 25 percent call restriction. This severity level means that the BTS 32 will not accept 25 percent of calls, while allowing the remaining 75 percent to be connected.

If the traffic condition is still high in spite of the call restriction at level L1, the overload controller 10 transmits the second restriction initiation message 15b to the call restriction processor 21m. Upon receipt of the second message 15b, the call restriction processor 21m increases the restriction level to L2. This severity level L2 is predefined as 50 percent call restriction, meaning that one out of two calls will be rejected.

If the traffic condition stays at high level in spite of the level L2 call restriction, the overload controller 10 transmits a third restriction initiation message 15c to the call restriction processor 21m.

Upon receipt of the third restriction initiation message 15c, the call restriction processor 21m further increase the restriction level to L3. This severity level L3 is predefined as 75 percent call restriction, meaning that three out of four calls will be rejected while only one will be accepted.

There are two ways to terminate call restriction; one is autonomous termination, and the other is invoked by an explicit control message (i.e., the restriction termination message) from the overload controller 10. For the autonomous termination control, the call restriction processor 21m is equipped with a call restriction timer. That is, the call restriction processor 21m activates the call restriction timer when a restriction initiation message arrived. If it received another restriction initiation message again before the timer expires, the call restriction processor 21m will raise the restriction level in a stepwise manner. In turn, each time the timeout occurs, the call restriction processor 21m will reduce the restriction level in a stepwise manner, thereby terminating the call restriction.

More specifically, FIG. 10 illustrates the usage of the call restriction timer that is programmed to operate at a time interval t. The timer is triggered in response to the first restriction initiation message 15a, which makes the level L1 restriction effective. In FIG. 10, since the second restriction initiation message 15b is received before expiration of the programmed time interval t, the restriction level is set to level L2. If the second restriction initiation message 15b had not reached there within the time t, the call restriction processor 21m would have cleared the call restriction autonomously due to the timeout of the call restriction timer.

Figure 11:
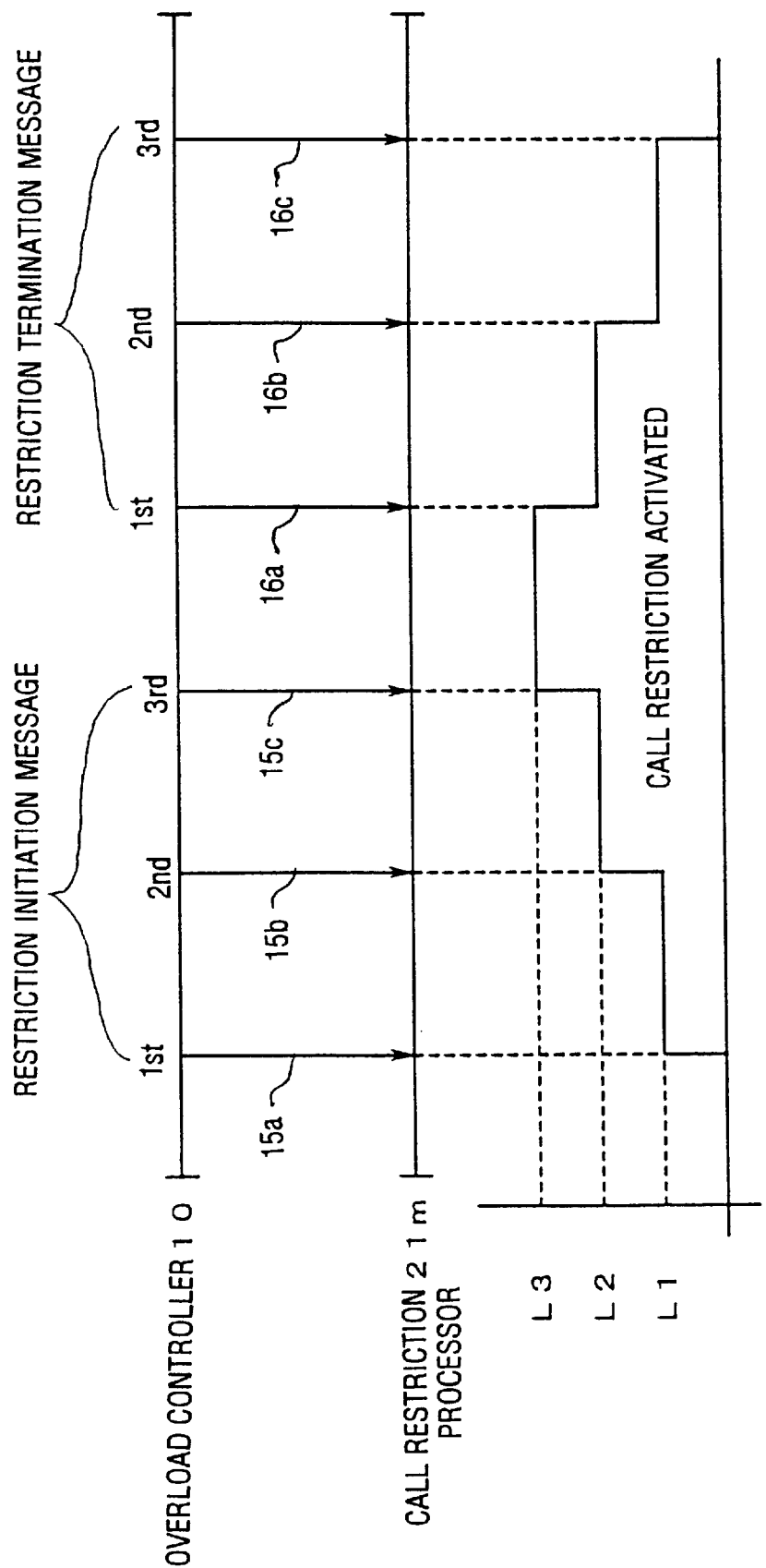
FIG. 11 is a diagram showing how the call restriction processor responds to restriction termination messages in the call restriction process.

In contrast to the above autonomous termination, the message-driven restriction termination will be conducted as follows. FIG. 11 is a diagram showing how the call restriction processor 21m will respond to restriction termination messages during a call restriction process. In the first half of FIG. 11, the restriction level steps up to level L3 simply in response to the restriction initiation messages 15a–15c, without using any timers. Subsequently, upon each reception of the restriction termination messages 16a and 16b from the overload controller 10, the restriction level steps down from L3 to L2, and then to L1. The third reception of the restriction termination message 16c will finally make the call restriction cleared, thus allowing the subject BTS to return to its normal condition.

Figure 12:
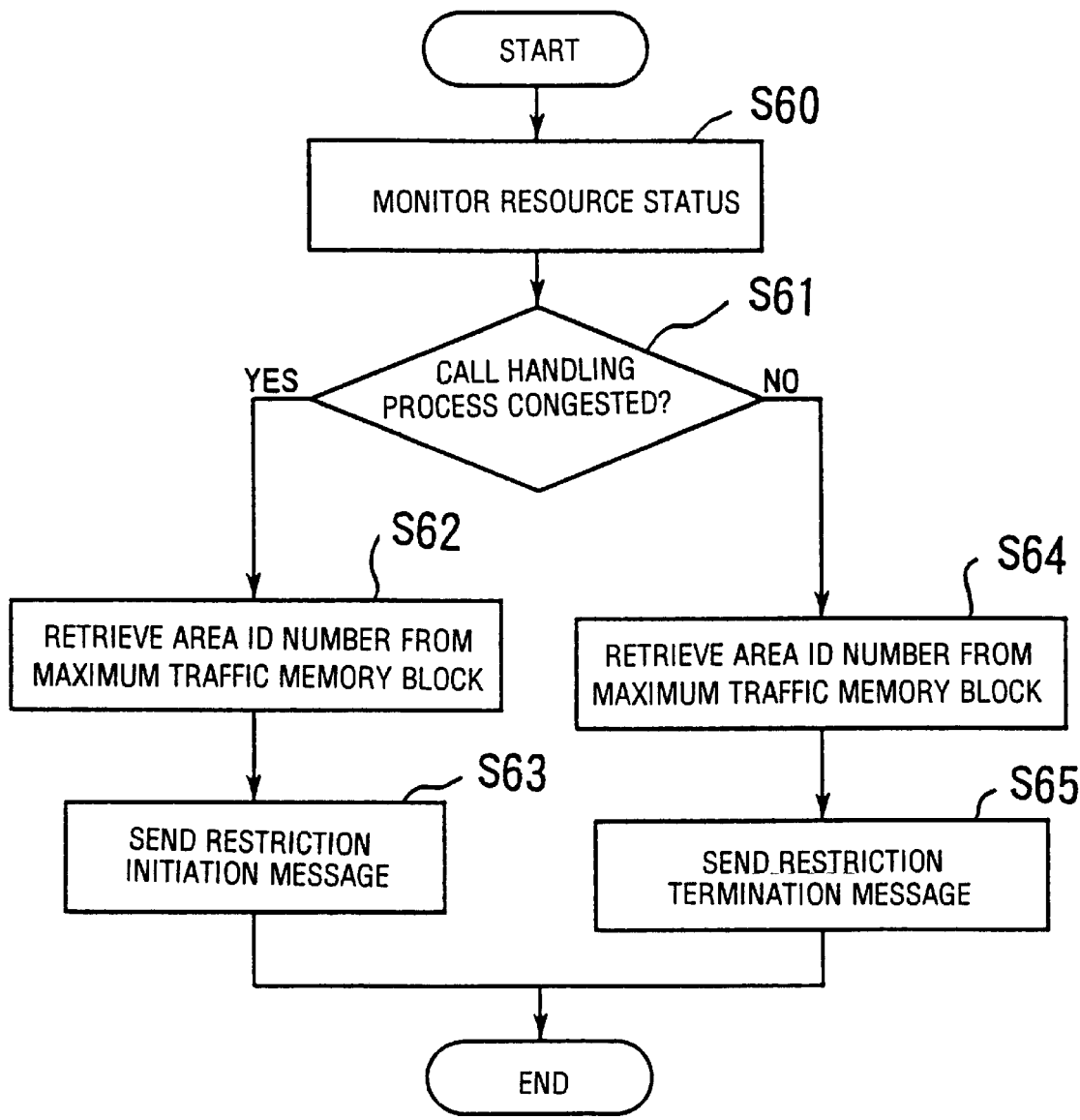
FIG. 12 is a flowchart showing how the restriction initiation messages and restriction termination message are issued.

FIG. 12 is a flowchart showing a procedure of handling the restriction initiation message and restriction termination message.

[S60] In the call-restricted area search processor 12 (FIG. 2), the resource monitoring means 12b monitors the CC usage rate and transaction usage rate in the CPR.

[S61] When congestion of call handling process is detected by the resource monitoring means 12b, the process advances to step S62. Otherwise, the process proceeds to step S64.

[S62] The call-restricted area decision means 12c retrieves the area identification number of the most congested coverage area out of the maximum traffic memory block 12a-2.

[S63] In the overload controller 10 (FIG. 1), the restriction control message processor 13 issues a restriction initiation message to the call restriction processor in a BTS that is responsible for the coverage area indicated by the area identification number retrieved in step S62.

[S64] The call-restricted area decision means 12c retrieves the area identification number of the most congested coverage area out of the maximum traffic memory block 12a-2.

[S65] In the overload controller 10, the restriction control message processor 13 issues a restriction termination message to the call restriction processor in the BTS of the coverage area indicated by the area identification number retrieved in step S64.

As described above, in the traffic management system of the first embodiment, the call restriction processor is disposed in each BSC to perform call restriction in a single cell.

Figure 13:
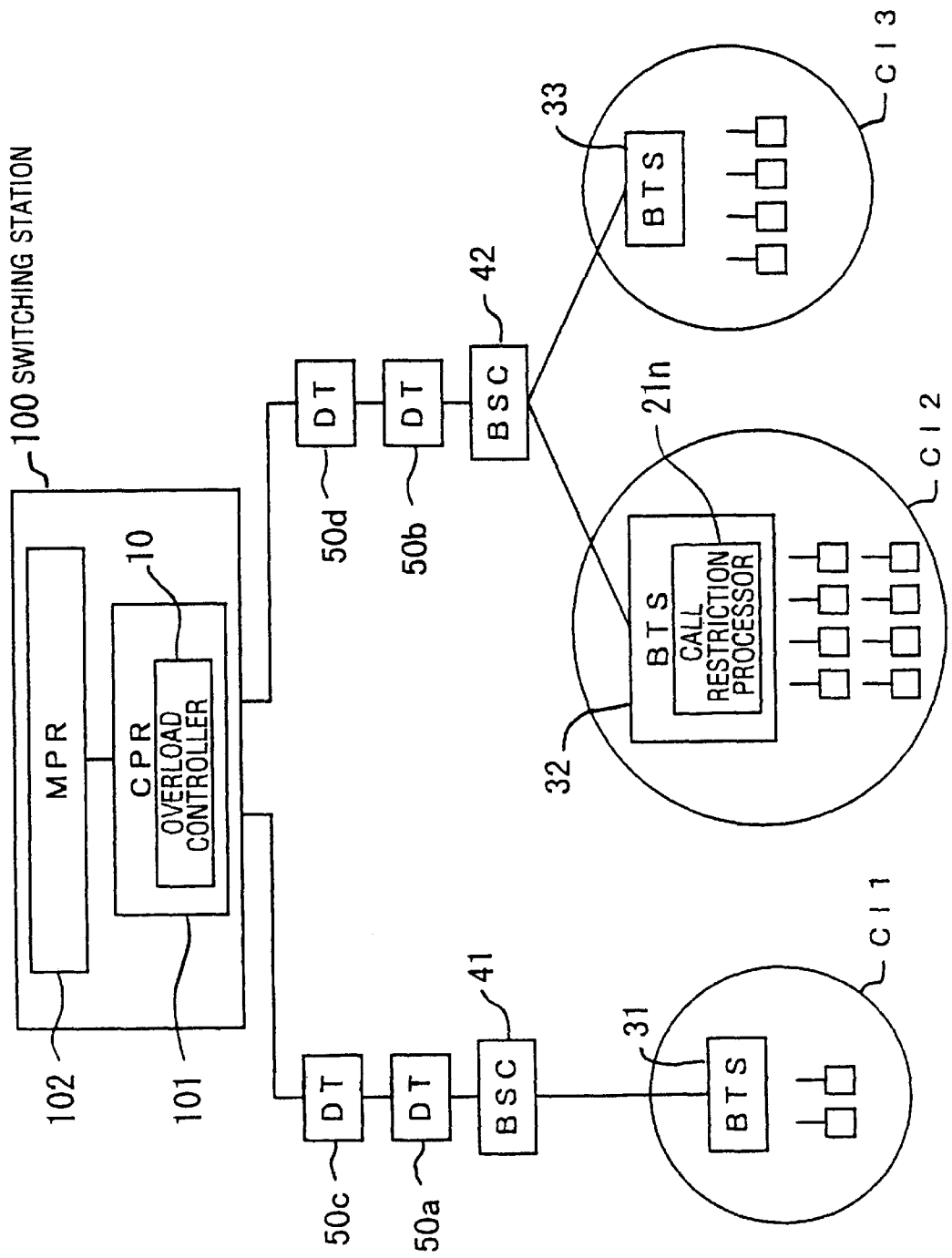
FIG. 13 is a diagram showing a second embodiment of the present invention, where another proposed traffic management system is implemented in a mobile communications network.

Referring next to FIG. 13, the following description will present a second embodiment of the present invention, where a second proposed traffic management system is applied to a mobile communications network. FIG. 13 show the system configuration of the second embodiment, in which call restriction processors are deployed in BTSs. It is assumed that the radio port coverage area CI2 is in a high-traffic condition, and therefore, it will be subjected to call restriction.

The mobile communications network illustrated in FIG. 13 comprises three cells CI1–CI3. The cell CI1 contains a BTS 31 which controls a radio link to MSs. The BTS 31 is connected to a BSC 41 which manages radio resources for the BTS 31 and handles communications protocol. The BSC 41 is linked to the switching station 100 via digital trunks 50a and 50c.

The cell CI2 includes a BTS 32, which is connected to another BSC 42. The BTS 32 is equipped with a call restriction processor 21n to regulate traffic in the cell CI2. Also, the cell CI3 includes a BTS 33, which is under the control of the BSC 42 as the BTS 32 is. The BSC 42, which manages radio resources and handles mobile communications protocol for both BTSs 32 and 33, is further connected to a switching station 100 via the digital trunks 50b and 50d.

The switching station 100, working as part of a public switched telephone network, contains a CPR 101 and an MPR 102. The overload controller 10 explained in FIG. 1 is disposed in this CPR 101. This mobile communications network performs normal call handling operations in the same way as described in the first embodiment.

When a highly dense traffic is observed in the cell CI2, the call restriction processor 21n executes call restriction within the cell CI2 in the same manner as described in the first embodiment.

As described above, in the traffic management system of the second embodiment, the call restriction processor is disposed in each BTS to perform call restriction in a single cell.

Figure 14:
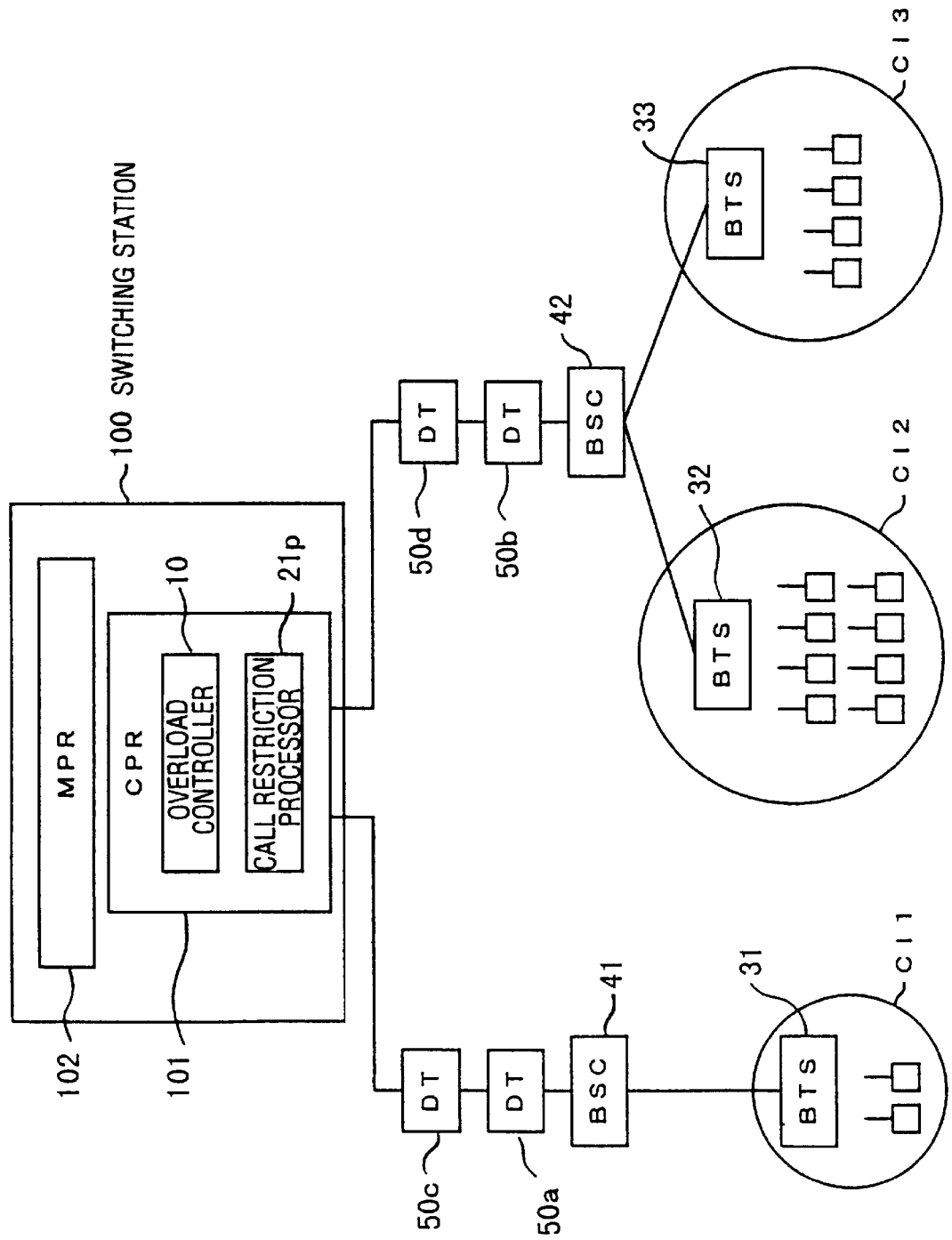
FIG. 14 is a diagram showing a third embodiment of the present invention, where still another proposed traffic management system is implemented in a mobile communications network.

Referring next to FIG. 14, the following description will present a third embodiment of the present invention, where a third proposed traffic management system is applied to a mobile communications network.

FIG. 14 shows a system configuration of the third embodiment. This third embodiment differs from the first and second embodiments in that the call restriction processor is integrated as part of the CPR. It is assumed that the cell CI2 is in a high-traffic condition, and therefore, it will be subjected to the call restriction.

The mobile communications network illustrated in FIG. 14 comprises three cells CI1–CI3. The cell CI1 contains a BTS 31 which controls a radio link to MSs. The BTS 31 is connected to a BSC 41 which manages radio resources for the BTS 31 and handles mobile communications protocol. The BSC 41 is linked to the switching station 100 via digital trunks 50a and 50c.

The cell CI2 includes a BTS 32, which is connected to another BSC 42. The cell CI3 includes a BTS 33, which is under the control of the same BSC 42. The BSC 42, which manages radio resources and handles mobile communications protocol for both BTSs 32 and 33, is further connected to the switching station 100 via the digital trunks 50b and 50d.

The switching station 100, working as part of a public switched telephone network, contains a CPR 101 and an MPR 102. The overload controller 10 explained in FIG. 1 is disposed in this CPR 101, and a call restriction processor 21p is also implemented as part of the CPR 101. Normal call handling operation of the above communications network will not be described here, for it is the same as that of the first embodiment.

Figure 15:
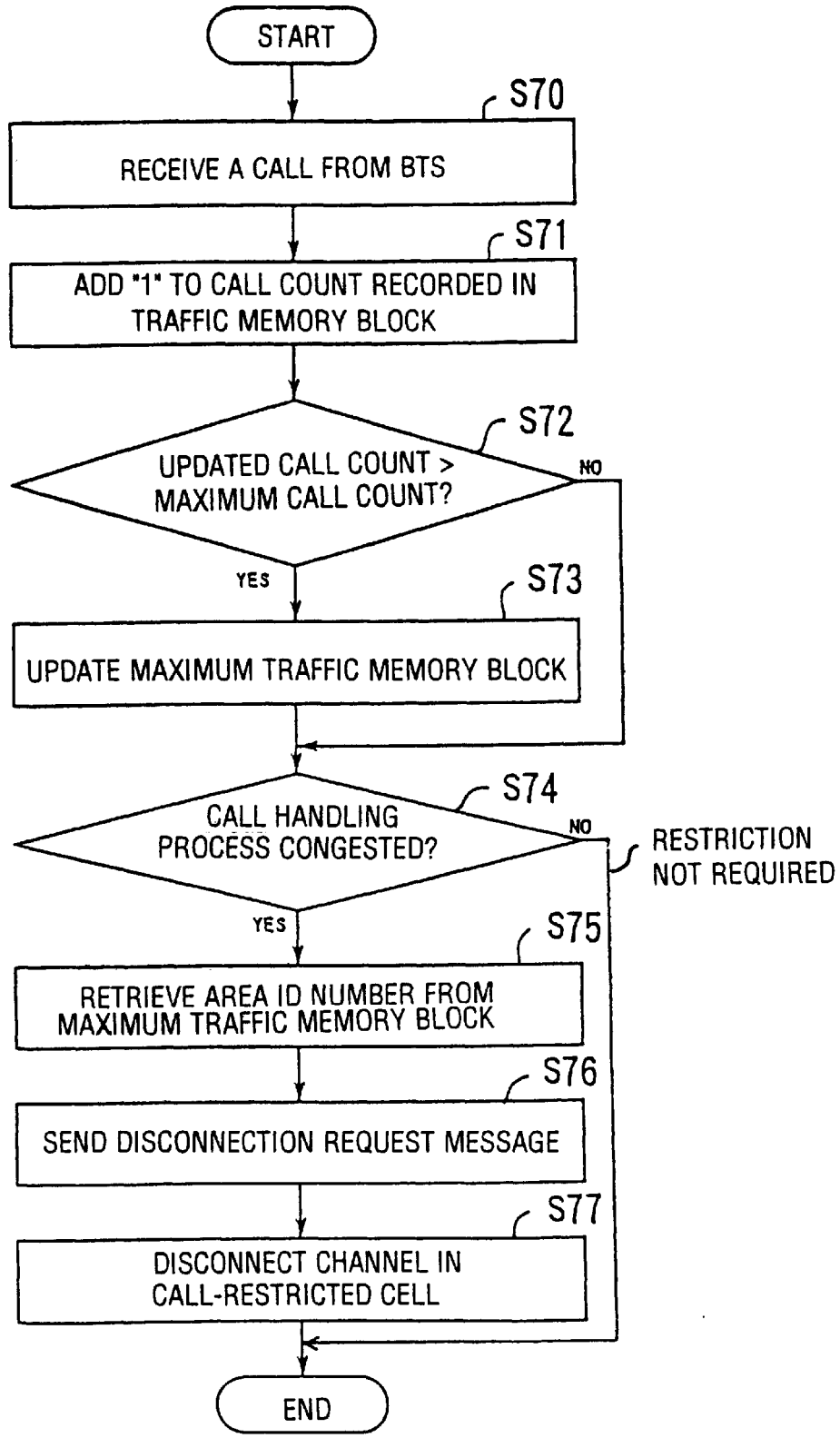
FIG. 15 is a flowchart showing an operation procedure of the third embodiment of the present invention.

When a highly dense traffic is observed in the cell CI2, the call restriction processor 21p in the CPR 101 executes call restriction within the cell CI2. FIG. 15 is a flowchart showing this call restriction process in the third embodiment. The process comprises the following steps S70 to S77.

[S70] The call-restricted area search processor 12 (see FIG. 2) receives a call from the BTS 32.

[S71] The call-restricted area search processor 12 identifies the BTS 32 and updates the call count recorded in one of the traffic memory blocks 12a-1 corresponding to the originating cell (i.e., cell CI2), by adding "1" to the present count value.

[S72] The call-restricted area decision means 12c determines whether or not the call count updated in step S71 is greater than the maximum call count stored in the maximum traffic memory block 12a-2. If it is greater than the present maximum value, the process advances to step S73. Otherwise, the process skips step S73 and proceeds to step S74.

[S73] The call-restricted area search processor 12 updates the maximum traffic memory block 12a-2 with the new call count value and area identification number of the originating coverage area CI2.

[S74] When the congestion of call handling process is detected by the resource monitoring means 12b, the process advances to step S75. Otherwise, the process is terminated since it is understood that there is no subject of call restriction.

[S75] The call-restricted area decision means 12c retrieves the area identification number of the most congested cell out of the maximum traffic memory block 12a-2. In the case of FIG. 14, the area identification number of the cell CI2 is retrieved.

[S76] The restriction control message processor 13 (see FIG. 1) in the overload controller 10 issues a clear request message to the call restriction processor 21p, which message is one of the three kinds of restriction control messages explained earlier.

[S77] The call restriction processor 21p performs call restriction by disabling the traffic channel that has just been used by the recent call to limit the communication resources available in the cell.

As described above, in the traffic management system of the third embodiment, the call restriction processor is disposed in the CPR to perform call restriction in a single cell.

Referring next to FIGS. 16 to 34, the following description will present a fourth embodiment in which the present invention is applied to a more specific digital mobile communications system. This system is based on the Global System for Mobile Communications (GSM) 01.02 recommendations, which was standardized by the European Telecommunications Standards Institute (ETSI).

Figure 16:
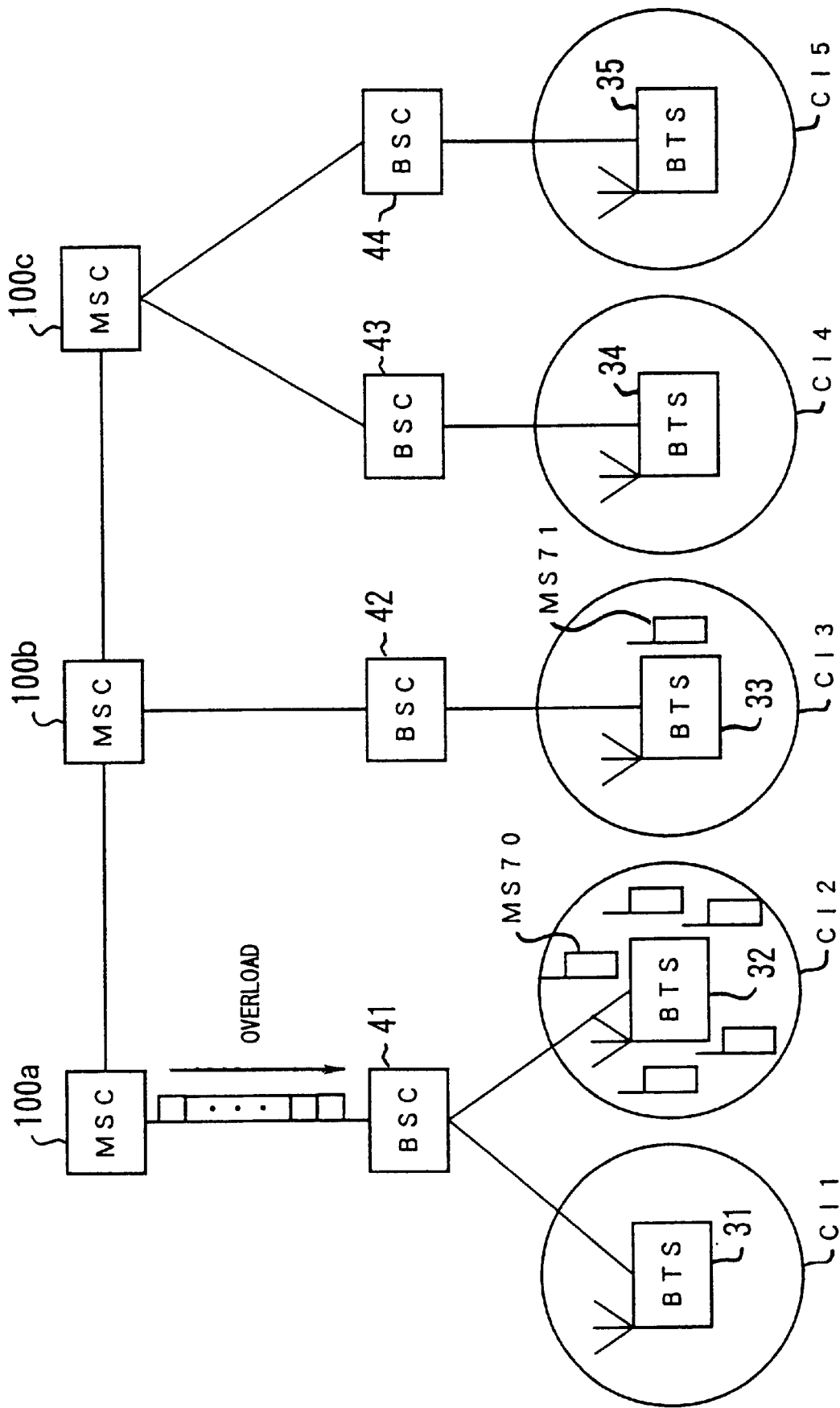
FIG. 16 is a diagram showing a fourth embodiment of the present invention, where a further proposed traffic management system is implemented in a digital mobile communications system constructed in accordance with the GSM recommendations.

FIG. 16 shows a system configuration of this fourth embodiment. The traffic management system of the present invention is implemented in a digital mobile communications system constructed in accordance with GSM recommendations. As the illustration of many MSs implies, the cell CI2 is the most congested coverage area that will be call-restricted. A call restriction processor is disposed in a BSC 41, although it is not shown in FIG. 16.

The mobile communications network illustrated in FIG. 16 has five cells CI1 to CI5. The first two cells CI1 and CI2 include BTSs 31 and 32, respectively. The BTSs 31 and 32 are connected to a BSC 41 which manages radio resources and handles mobile communications protocol for them. The BSC 41 is further linked to a MSC 100a via digital trunks (not shown in FIG. 16).

The cell CI3 includes a BTS 33, which is connected to another BSC 42, and the BSC 42 is linked to another MSC 10b.

The cell CI4 includes a BTS 34, which is connected to still another BSC 43. The BSC 43 is connected to still another MSC 100c.

The cell CI5 includes a BTS 35, which is connected to another BSC 44. The BSC 44 is also connected to the MSC 100c. Further, communications links are provided between the MSCs 100a and 100b and between the MSCs 100b and 100c.

The BSC 41 receives an "OVERLOAD" message from the MSC 100a, since the cell CI2 is subject to call restriction. Here, the "OVERLOAD" is a message defined in the GSM recommendations to indicate processor overload, which corresponds to the restriction initiation message in the present invention.

Figure 17:
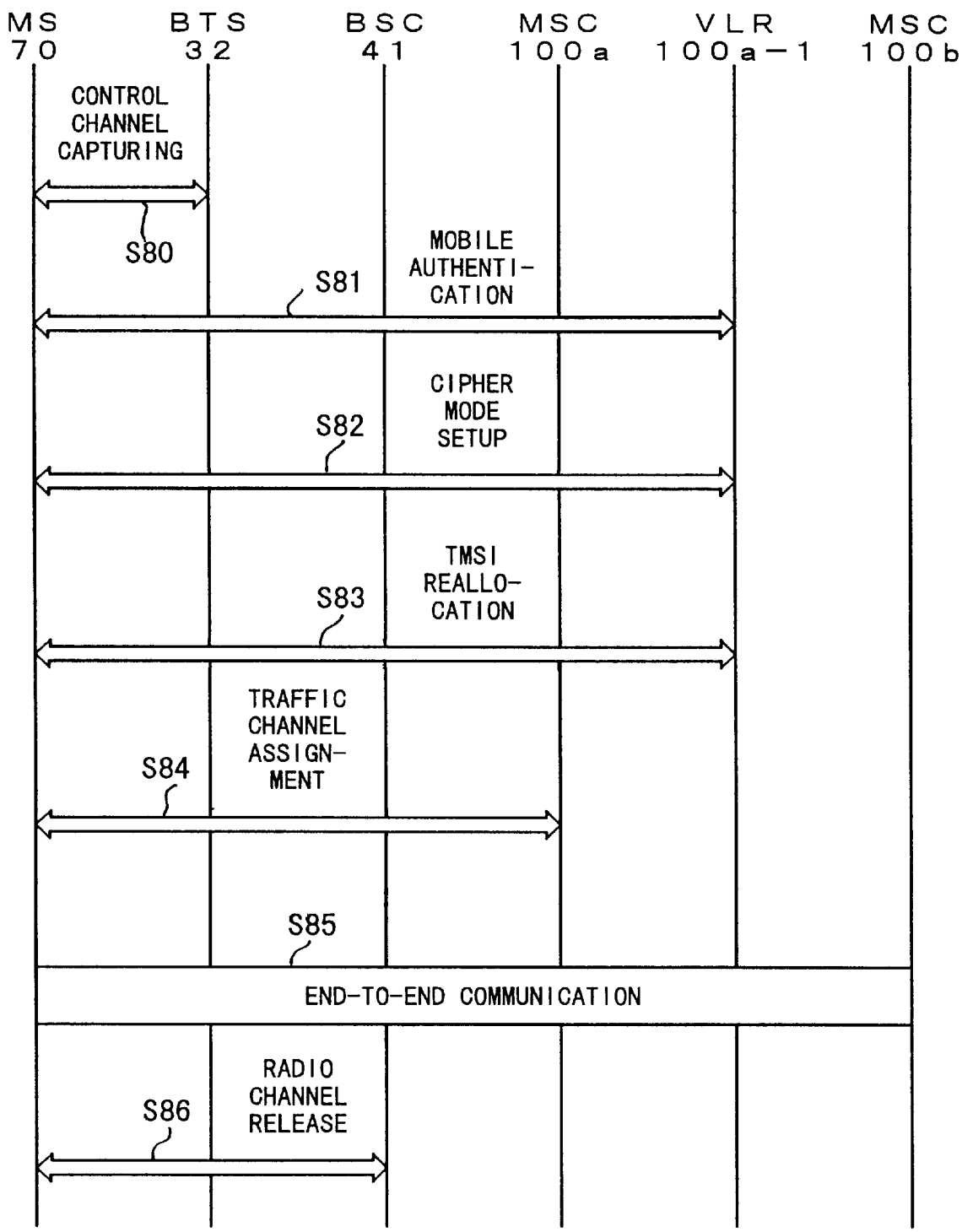
FIG. 17 is a sequence diagram showing an outline of call setup procedure initiated by a mobile station.

With reference to FIGS. 17 to 23, the following description will explain the call origination and reception between two MSs 70 and 71. FIG. 17 is a sequence diagram that outlines a call origination process initiated by the calling MS 70. The sequence comprises the steps of S80 to S86 as described below.

[S80] A control channel is captured for interaction between the MS 70 and BTS 32.

[S81] Authentication of the mobile station is performed between the MS 70 and a visited location register (VLR) 100a-1, an integral part of the MSC 100a, to entitle the subscriber to service.

[S82] Cipher mode is established between the MS 70 and VLR 100a-1.

[S83] TMSI reallocation is performed between the MS 70 and VLR 100a-1 to reallocate a temporary mobile station identity (TMSI) to the MS 70.

[S84] A traffic channel is assigned for interaction between the MS 70 and MSC 100a.

[S85] The MS 70 is connected to the called party through the MSCs 100a and 100b.

[S86] The MS 70 releases the radio resource (i.e., both control channel and traffic channel) which has been used to communicate with the BSC 41.

Figure 18:
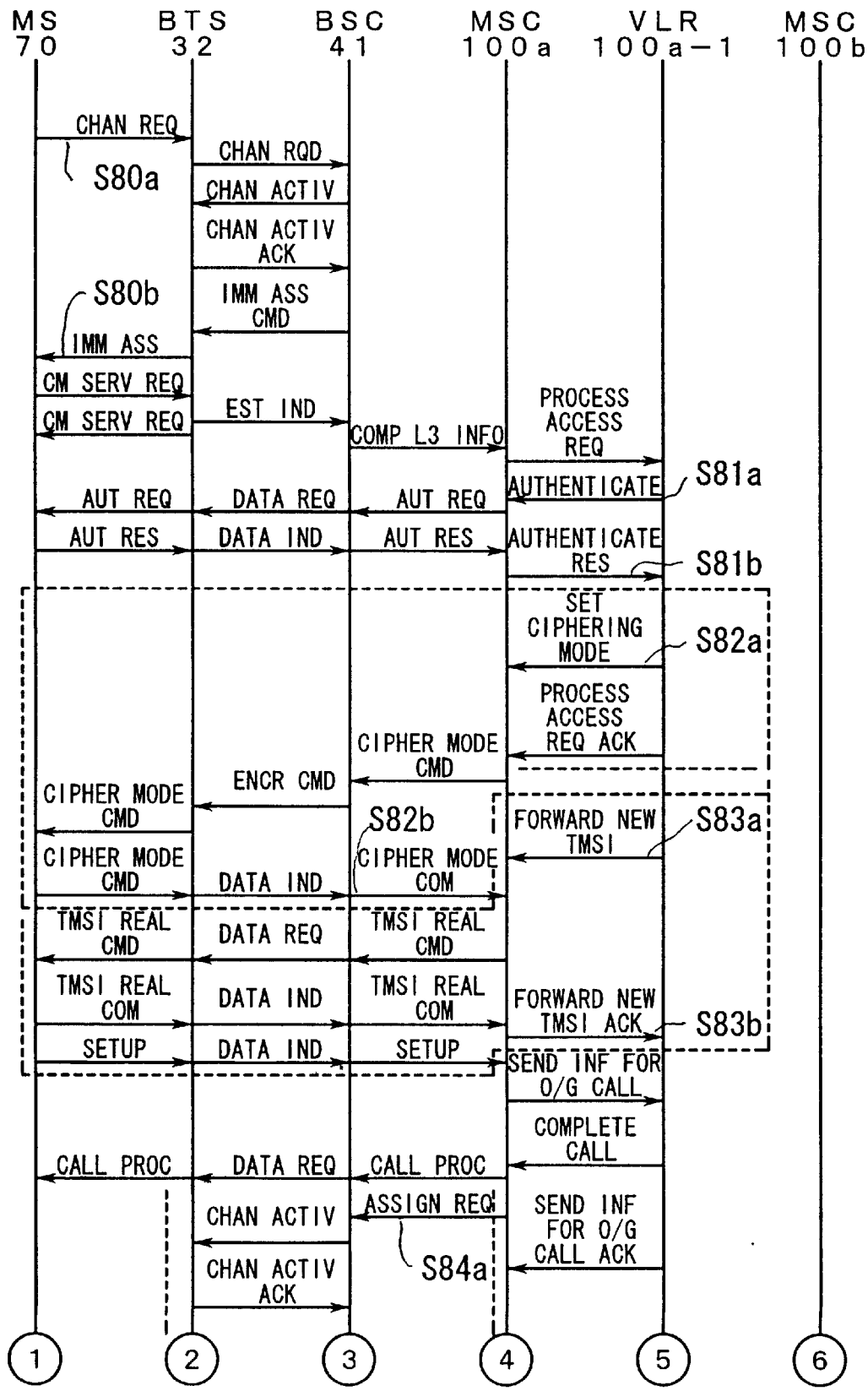
FIGS. 18 and 19 are detailed sequence diagrams to clarify the call setup procedure based on the GSM recommendations.
Figure 19:
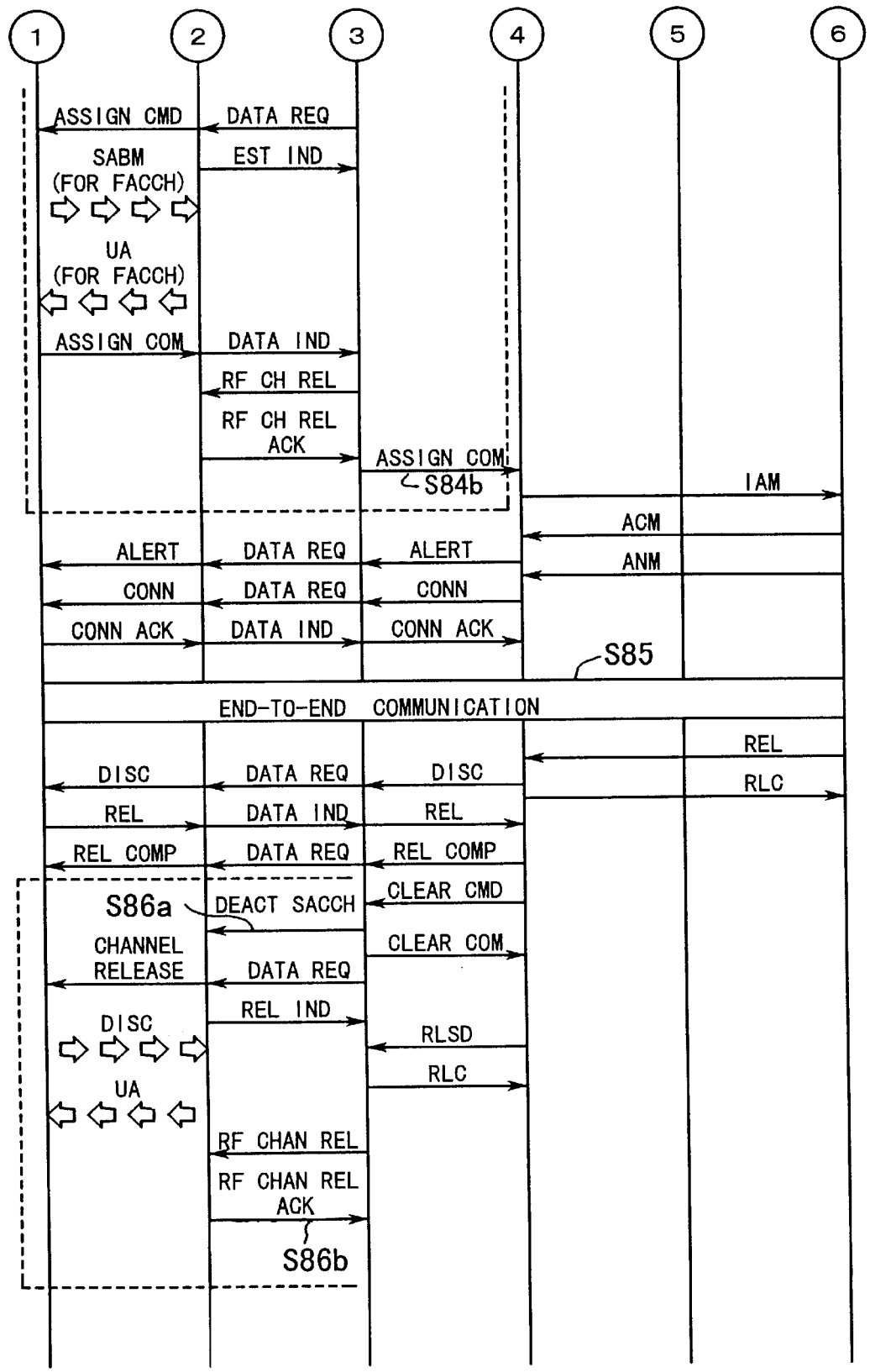

FIGS. 18 and 19 are sequence diagrams based on the GSM recommendations to clarify the details of the call setup process outlined in FIG. 17. Each part of the sequence diagram corresponds to the steps S80 to S86 described in FIG. 17.

a) S80 (control channel capturing) —From S80a "CHAN REQ" to S80b "IMM ASS"
b) S81 (mobile authentication) —From S81a "AUTHENTICATE" to S81b "AUTHENTICATE RES"
c) S82 (cipher mode setup) —From S82a "SET CIPHERING MODE" to S82b "CIRHER MODE COM"
d) S83 (TMSI reallocation) —From S83a "FORWARD NEW TMSI" to the S83b "FORWARD NEW TMSI ACK"
e) S84 (traffic channel assignment) —From S84a "ASSIGN REQ" to S84b "ASSIGN COM"
f) S86 (radio channel release) —From S86a "DEACT SACCH" to S86b "RF CHAN REL ACK"

Figure 20:
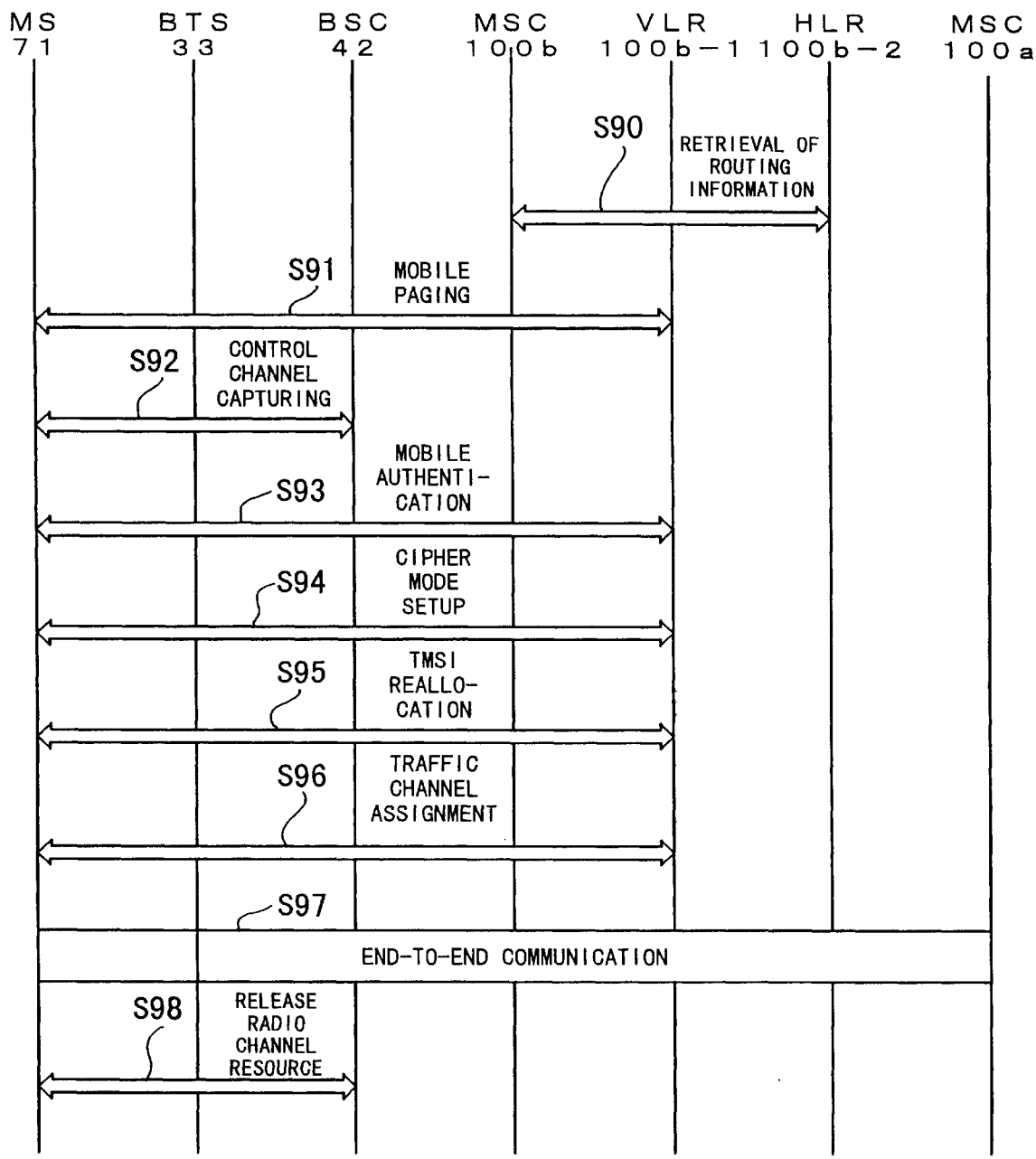
FIG. 20 is a sequence diagram showing an outline of call setup procedure executed at a called mobile station.

Referring next to FIG. 20, the following description will outline the call reception sequence at the MS 71.

[S90] The MSC 100b retrieves routing information of the called MS 71 from a home location register (HLR) 100b-2.

[S91] The MS 71 is paged by a VLR 100b-1.

[S92] A control channel is captured for interaction between the MS 71 and VLR 100b-1.

[S93] Authentication of the mobile station is performed between the MS 71 and VLR 100b-1.

[S94] Cipher mode is established between the MS 71 and VLR 100b-1.

[S95] TMSI reallocation is performed between the MS 71 and VLR 100b-1.

[S96] A traffic channel is assigned for use in interaction between the MS 71 and VLR 100b-1.

[S97] End-to-end connection is set up between the calling party (MS 70) and the called party (MS 71) through the MSCs 100a and 100b.

[S98] The MS 71 releases the radio resource which has been used to communicate with the BSC 41.

Figure 21:
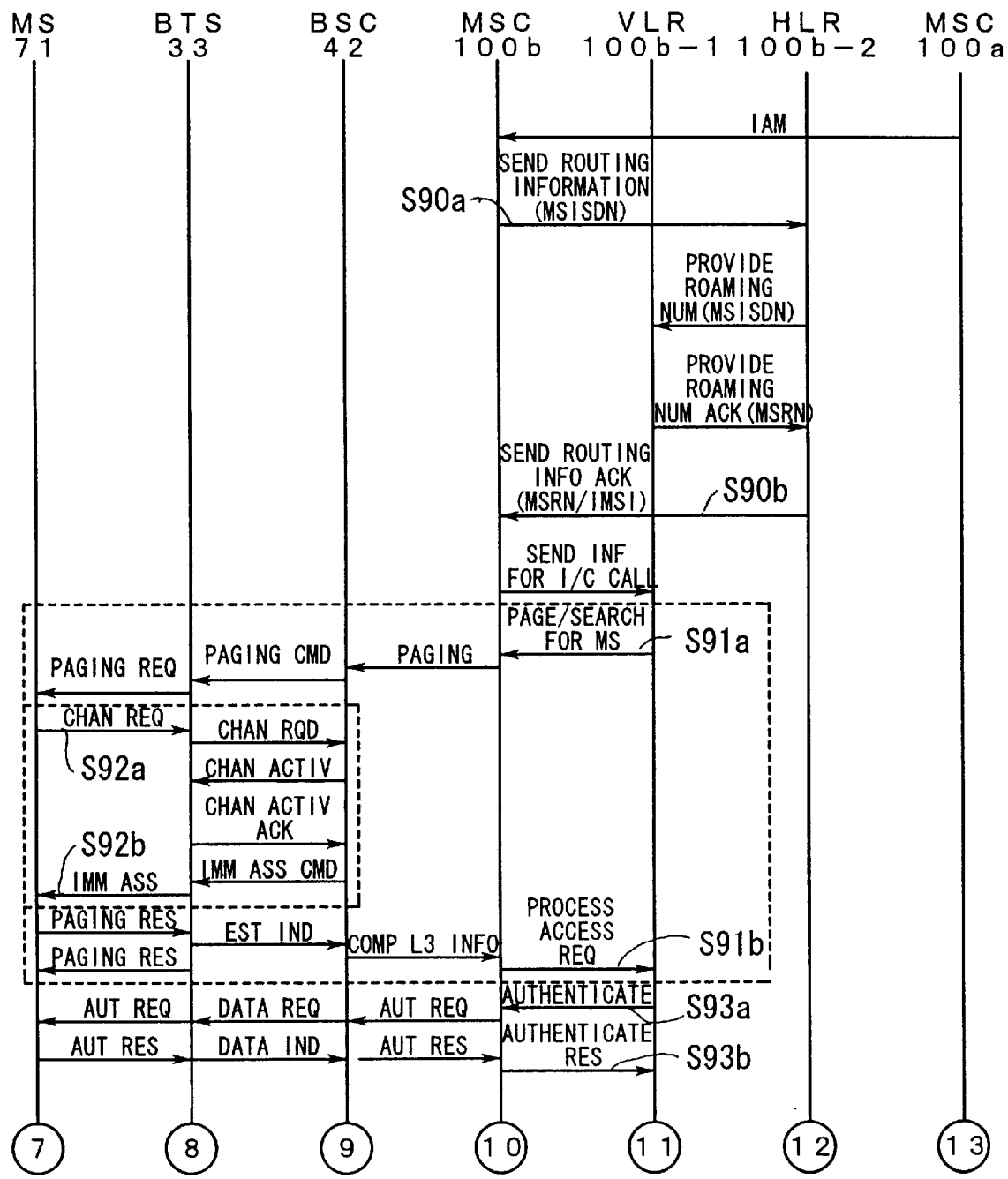
FIGS. 21, 22, and 23 are detailed sequence diagrams to clarify the call setup procedure executed by a called mobile station based on the GSM recommendations.
Figure 22:
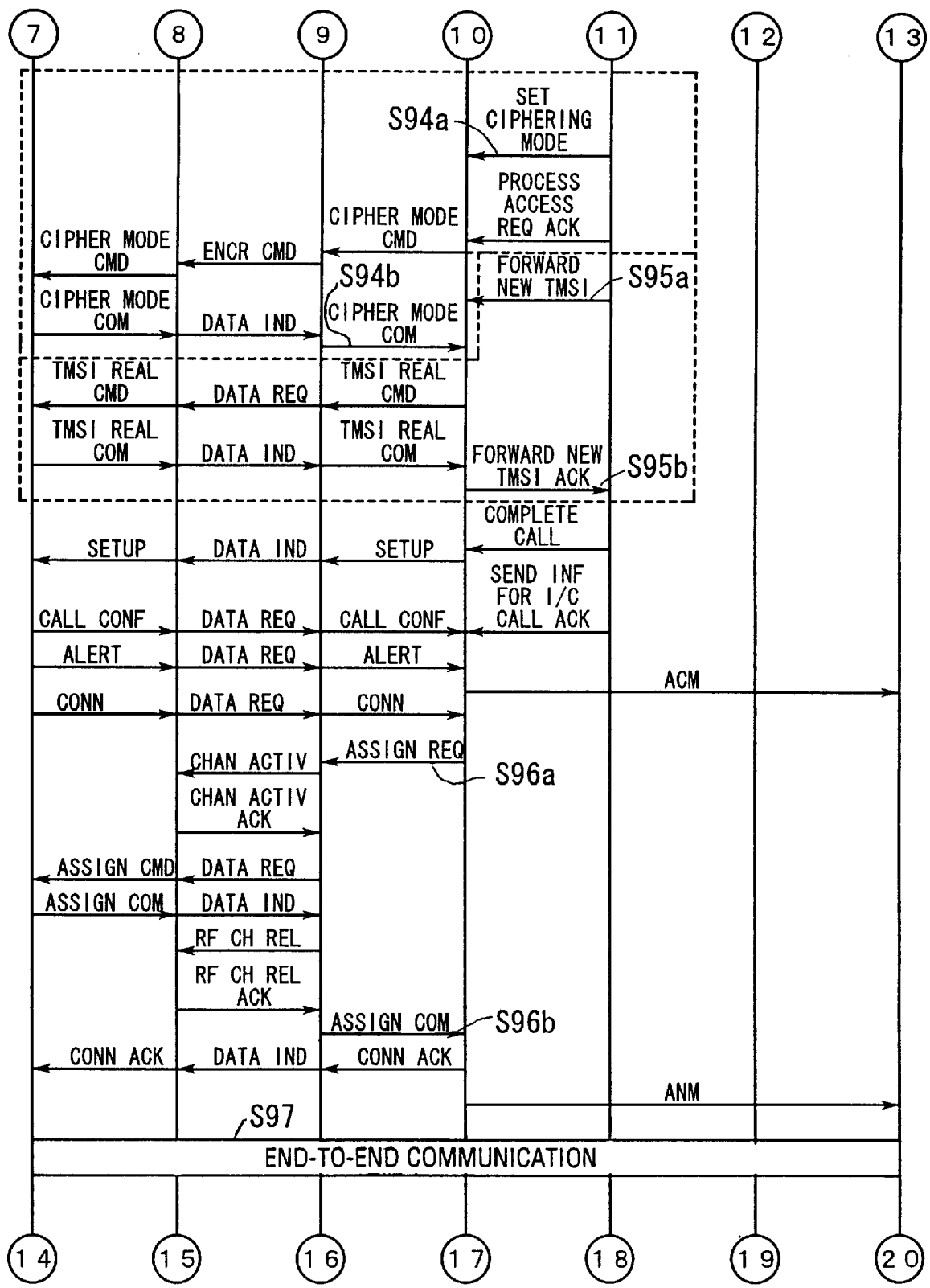
Figure 23:
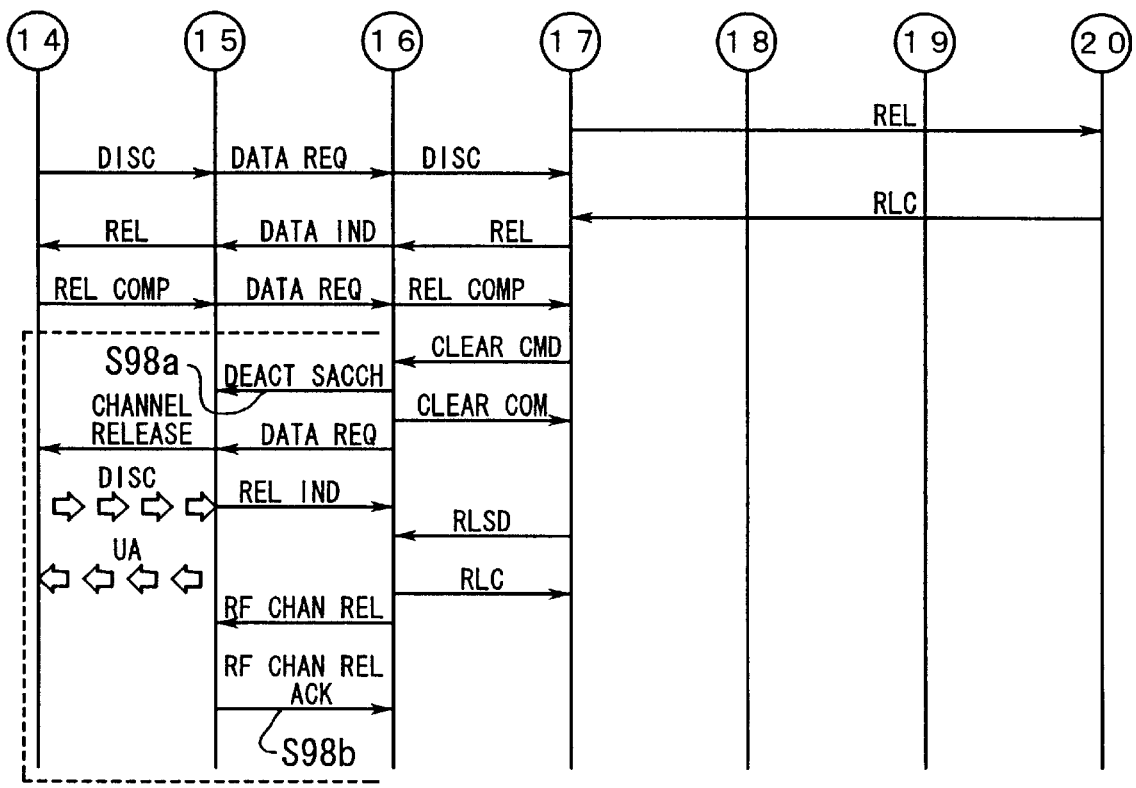

FIGS. 21, 22, and 23 are sequence diagrams based on the GSM recommendations to clarify the details of the incoming call reception process outlined in FIG. 20. Each part of the sequence diagram corresponds to either step of S90 to S98 in FIG. 20.

a) S90 (retrieval of routing information) —From S90a "SEND ROUTING INFORMATION" to S90b "SEND ROUTING INFOR ACK"
b) S91 (mobile paging) —From S91a "PAGE/SEARCH FOR MS" to S91b "PROCESS ACCESS REQ"
c) S92 (control channel capturing) —From S92a "CHAN REQ" to S92b "IMM ASS"
d) S93 (mobile authentication) —From S93a "AUTHENTICATE" to S93b "AUTHENTICATE RES"
e) S94 (cipher mode setup) —From S94a "SET CIPHERING MODE" to S94b "CIPHER MODE COM"
f) S95 (TMSI reallocation) —From S95a "FORWARD NEW TMSI" to S95b "FORWARD NEW TMSI ACK"
g) S96 (traffic channel assignment) —From S96a "ASSIGN REQ" to S96b "ASSIGN COM"
h) S98 (release radio channel resource)—From S98a "DEACT SACCH" to S98b "RF CHAN REL ACK"

In the GSM terminology, the network subsystems consisting of base station controllers and base transceiver stations are collectively called base station subsystems (BSS). The following description will show a hardware configuration of MSC and BSS.

Figure 24:
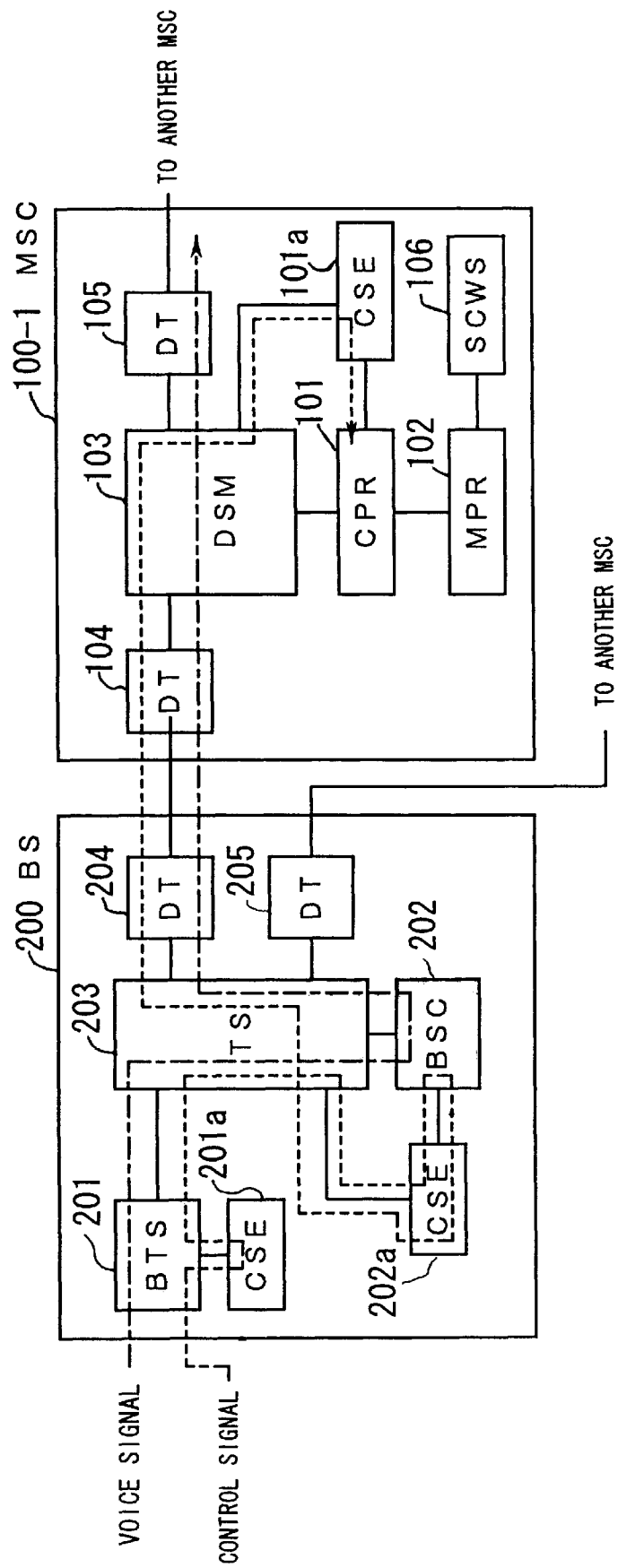
FIG. 24 is a diagram showing a hardware configuration of a mobile switching center and a base station subsystem.

FIG. 24 is a block diagram of an MSC 100-1 and a BSS 200. The BSS 200 comprises a BTS 201 and a BSC 202, which are coupled to common channel signaling equipment (CSE) 201a and 202a, respectively. The BTS 201 and BSC 202 are linked to each other via a time switch (TS) 203 which routes the voice and control signals. The voice and control signals are sent to/from the MSC 101-1 and other MSCs via digital trunks (DTs) 204 and 205.

The MSC 100-1 comprises a CPR 101 and an MPR 102. A CSE 101a is coupled to the CPR 101, while a maintenance console (SCWS) 106 is coupled to the MPR 102. With control commands from the CPR 101 and MPR 102, a digital switching module (DSM) 103 switches the voice and control signals and delivers them to other MSCs via a DT 105.

FIG. 24 further shows the flow of the above-described voice and control signals. More specifically, the voice signal flow is indicated by the dotted line, while the control signal flow is represented by the alternating long and short dashes. The voice signals are transmitted from the BTS 201 to the TS 203 and directed to the BSC 202. It then returns to the TS 203 and sent out from the BS 200 via the DT 204. In the receiving MSC 100-1, the DT 104 accepts the voice signals and forwards them to other MSC via the DSM 103 and DT 105.

On the other hand, the control signals from the BTS 201 are handled in the CSE 201a and then transmitted to the TS 203. The TS 203 directs the received control signals to the CSE 202a for use in the BSC 202, and the signals returns to the TS 203 via the CSE 202a. The TS 203 then transfers them to the DSM 103 via the DT 204 and DT 104. The CPR 101 receives the control signals via the CSE 101a.

Figure 25:
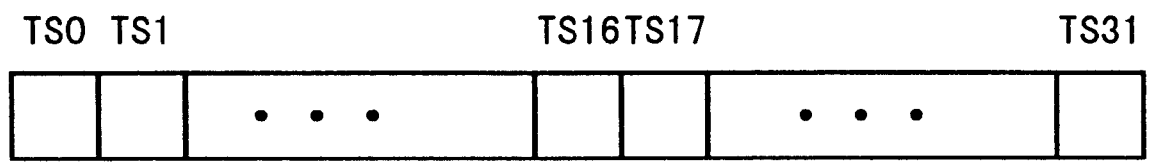
FIG. 25 is a diagram showing the structure of time slots.

Those voice and control signals are transported over the digital trunk by using a time-division multiplexing scheme. That is, each frame is subdivided into thirty-two time slots TS0 to TS31 as shown in FIG. 25. For the system use, the first time slot TS0 is reserved for error monitoring, and the time slot TS16 is assigned for common-channel signaling between MSC and BTS. The remaining thirty slots are used as voice channels to carry coded speech data and the like.

Figure 26:
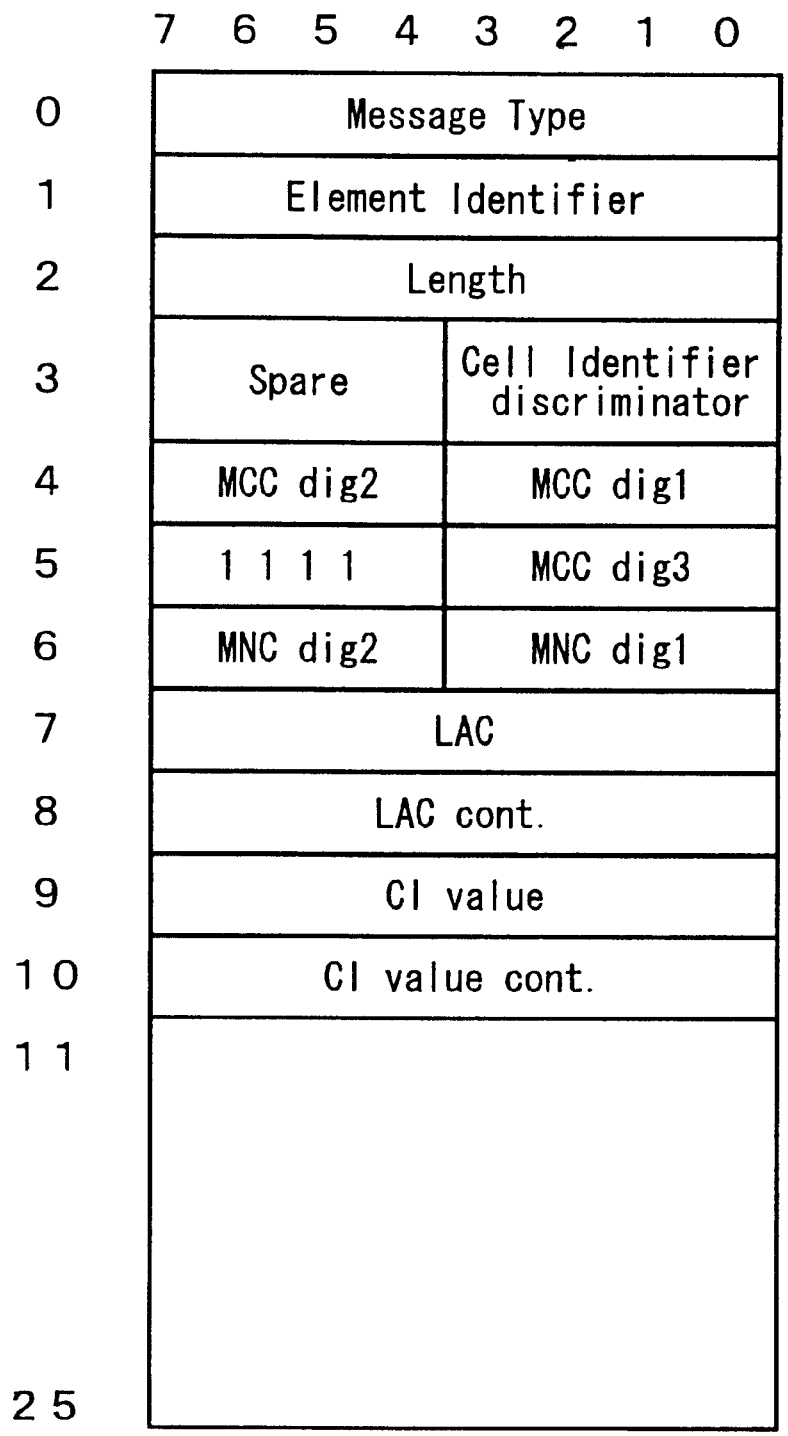
FIG. 26 is a diagram showing a "COMPLETE LAYER 3 INFORMATION" message format.

The network entities communicate with each other by exchanging messages based on some prescribed protocol standards. The following description will present some examples of such messages. FIG. 26 is a diagram showing the message format of "COMPLETE LAYER 3 INFORMATION" message which is defined in the GSM recommendations to support call setup sequence. This message is composed of twenty-six octets (octet #0 to #25). More specifically, the first eleven octets, i.e., octet #0 to #10, have the following definitions.

Octet #0 represents "Message Type," and the code "01010111" is entered there to indicate that the message is a "COMPLETE LAYER 3 INFORMATION" message. Octet #1 is "Element Identifier," and a code "00000101" meaning "Cell Identifier" is entered thereto. Octet #2 representing "Length" is set to "00001000. The least significant 4-bit of octet #3 represents "Cell Identification Discriminator" and has a value of "0000," while the most significant 4-bit is reserved as a spare field.

Octets #4 and #5 are divided into four 4-bit code locations to store three-digit mobile country code, MCC dig1 to MCC dig3, which is assigned to a mobile station, while the upper 4-bit of octet #5 is a spare field filled with a bit pattern "1111.

Likewise, octet #6 represents two-digit mobile network code, MNC dig1 and MNC dig2. Octets #7 and #8 represent a two-octet-long location area code, LAC and LAC cont. Octets #9 and #10, respectively named CI value and CI value cont, store a cell identifier (CI), or area identification number.

Figure 27:
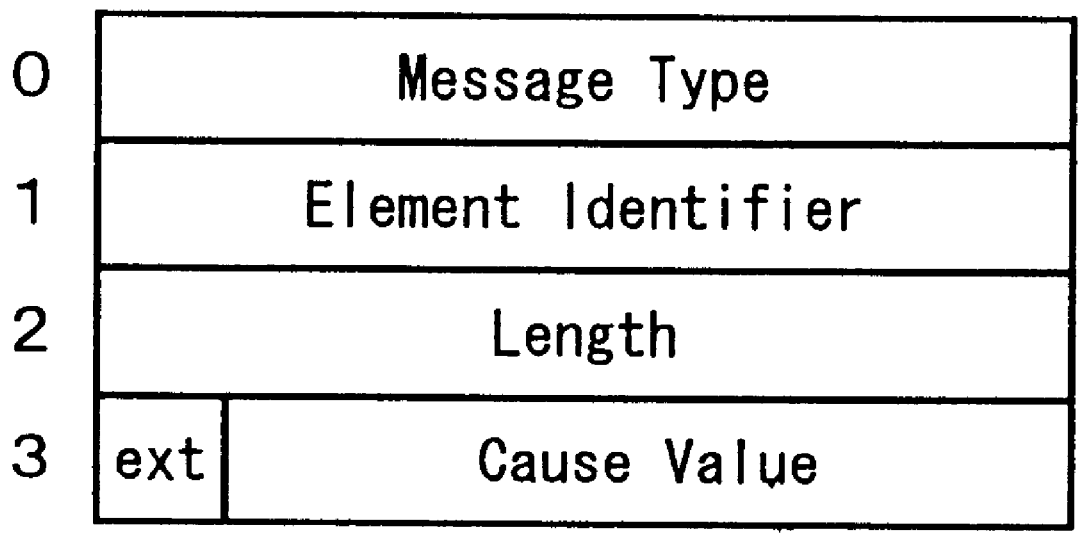
FIG. 27 is a diagram showing a "CLEAR COMMAND" message format.

Next, another GSM-specified message "CLEAR COMMAND" will be described below. FIG. 27 showing a "CLEAR COMMAND" message format.

Octet #0 represents "Message Type," where a code "01010111" for "CLEAR COMMAND" is placed. Octet #1 is "Element Identifier," where a code "00000100" indicating "Cause" is entered. Octet #2 representing "Length" is set to "00000001. The most significant bit (MSB) of Octet #3 is defined as "ext" and has a value "1." The rest is used to show "Cause Value" and it is set to "0100100" representing that the cause is processor overload.

Next, still another GSM-specified message "OVERLOAD," which corresponds to the restriction initiation message in the present invention, will be described below. FIG. 28 shows a format of this "OVERLOAD" message.

Octet #0 representing "Message Type" is given a code "00110010" to show that this message carries overload information. Octet #1 is "Element Identifier," where a code "00000100" indicating "Cause" is entered. Octet #2 "Length" is set to "00000001. The MSB of Octet #3 is defined as "ext" and has a value "1." The rest is used to show a "Cause Value" and it is set to "0100011" for CCCH overload or to "0000111" for O&M intervention. Octet #4 is "Element Identifier," which is set to "00000101" to show that a cell identifier is to follow. Octet #5 representing "Length" is set to "00001000. The least significant 4-bit of octet #6 represents "ext" and has a value of "0000," while the most significant 4-bit of octet #3 is a spare field.

Octets #7 and #8 are divided into four 4-bit code locations to store three digits of mobile country code, MCC dig1 to MCC dig3, although the upper 4-bit of octet #8 is a spare field filled with a bit pattern "1111.

Likewise, octet #9 represents two-digit mobile network code, MNC dig1 and MNC dig2. Octets #7 and #8 represent a two-octet-long location area code, LAC and LAC cont.

Octets #12 and #13, named "CI value" and "CI value cont.", store the cell identifier (CI) value.

Next, the following description will explain about "OVERLOAD RESTORATION" message which serves as the restriction termination message. It should be noted that this "OVERLOAD RESTORATION" message is not specified in the GSM recommendation documents but proposed in the present invention.

FIG. 29 is a diagram showing a message format of "OVERLOAD RESTORATION." Octet #0 represents "Message Type" and it is given a code "00110011" to show that this message carries overload restoration information. Octet #1 is "Element Identifier," which is set to "00000101" to show that a cell identifier is to follow. Octet #2 representing "Length" is set to "00001000. The least significant 4-bit of octet #3 represents "ext" and has a value of "0000," while the most significant 4-bit is a spare field. Octets #4 and #5 are divided into four 4-bit code locations to store three-digit mobile country code, MCC dig1 to MCC dig3, although the upper 4-bit of octet #5 is padded "1111. Likewise, octet #6 represents two-digit mobile network code, MNC dig1 and MNC dig2. Octets #7 and #8 represent two-octet-long location area code, LAC and LAC cont. Octets #9 and #10, respectively named CI value and CI value cont., store a cell identifier value.

Figure 30:
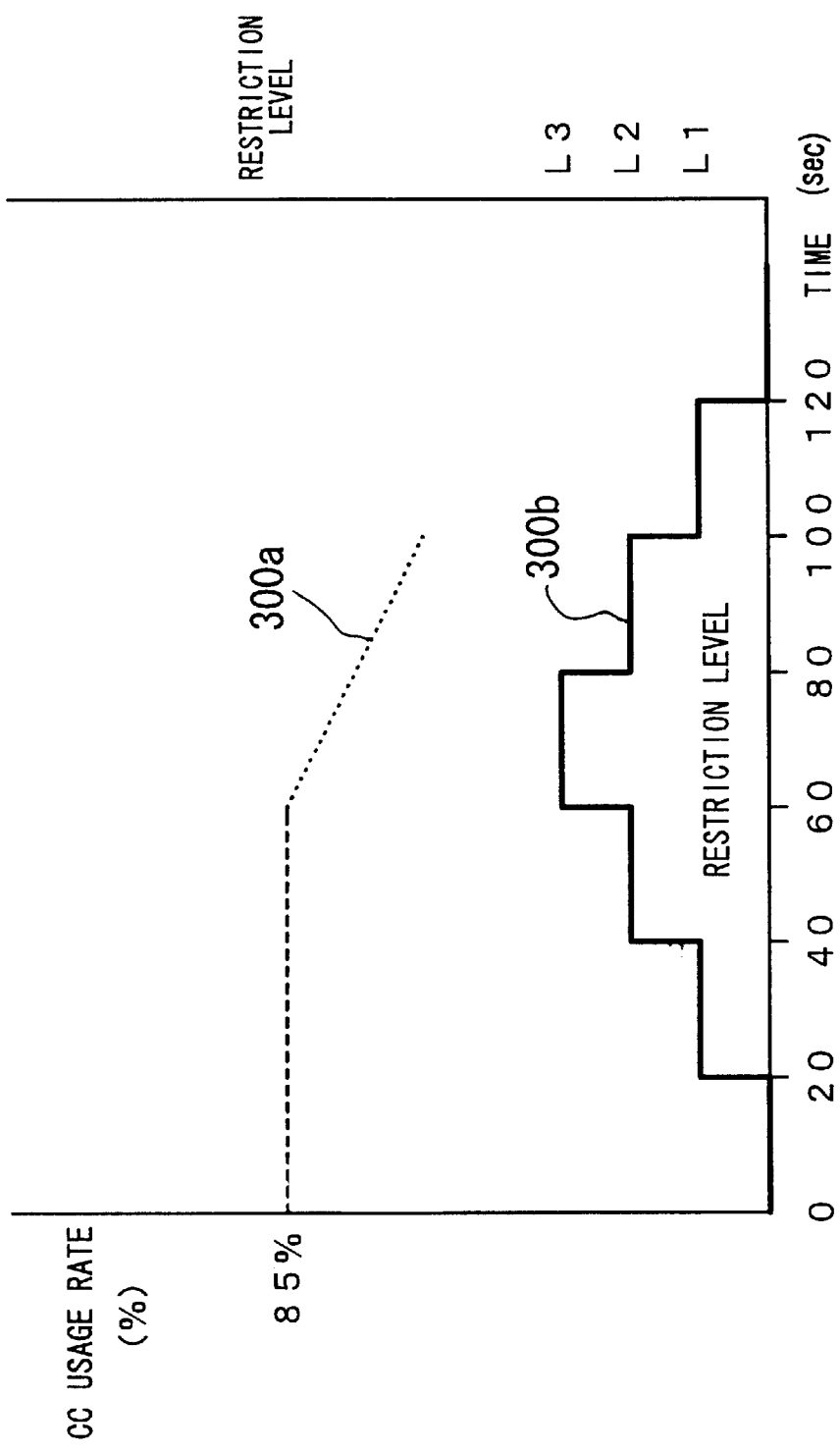
FIG. 30 is a diagram showing how the call restriction process manages CC usage rates.
Figure 31:
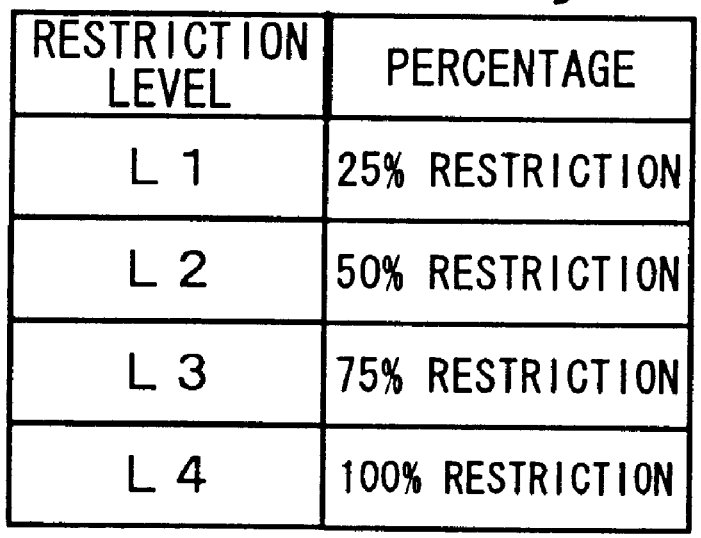
FIG. 31 is a table showing relationships between restriction levels and their respective percentage values for call restriction.

Referring next to FIGS. 30 and 31, the following description will explain the relationship between the central controller (CC) usage rate and the call restriction process. FIG. 30 is a diagram showing how the call restriction process manages the CC usage rate. In FIG. 30, a typical CC usage rate variation with time is plotted in a dotted line 300a, and the changes of restriction level corresponding to the CC usage rate variation is plotted in a solid line 300b. The origin of the time axis is set to the time when the CC usage rate exceeded 85 percent, which threshold value has been set in advance. The call restriction process starts with restriction level L1 when 20 seconds elapsed. When another 20 seconds have passed, the restriction level is raised to L2 since the CC usage rate does not seem to decrease. When still another 20 seconds have passed, the restriction is further enhanced to level L3. Then the CC usage rate begins to drop, and accordingly, the restriction level is reduced at every 20 seconds. The threshold level of the CC usage rate is a programmable value, although it is currently set to 85 percent. Maintenance engineers can change the threshold level by entering a certain command to the system.

FIG. 31 is a table showing an example of the definition of restriction levels. A restriction level table 301 specifies 25 percent as the restriction level L1, which means the system will not accept 25 percent of calls. Likewise, the restriction levels L2 and L3 are set to 50 percent and 75 percent, respectively, to provide more severe regulation by rejecting 50 or 75 percent of incoming calls. The restriction level L4 is defined to be 100 percent. If this level L4 is applied, the system would not accept the calls at all.

Figure 32:
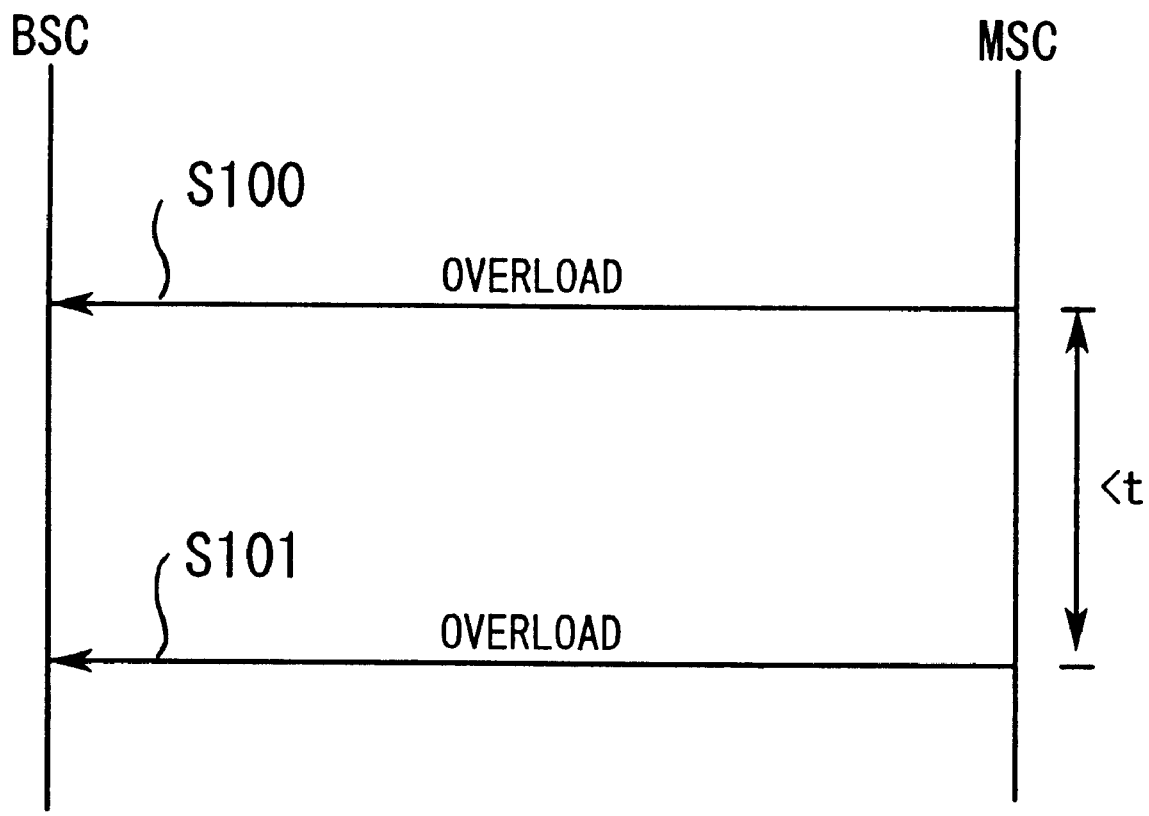
FIG. 32 is an overload control sequence diagram showing interaction between a base station controller and a mobile switching center when clearing the call restriction by using a call restriction timer.

Based on the above-described message definitions and restriction level settings, the traffic management system according to the present invention will execute an overload control sequence as described below. FIG. 32 is an overload control sequence diagram showing how a BSC will interact with an MSC when clearing call restriction by using a call restriction timer.

[S100] The BSC receive an "OVERLOAD" message from the MSC.

[S101] Upon receipt of the message, the BSC activates the call restriction timer. If it received another "OVERLOAD" message again before the call restriction timer expires, the BSC will raise the restriction level in a stepwise manner according to the restriction level definition table. When in turn the timeout occurred, the BSC will reduce the restriction level by one rank and finally terminate the call restriction after repeating the level reduction. FIG. 32 shows that the MSC receives the second "OVERLOAD" message before timeout, which will increase the restriction level.

Figure 33:
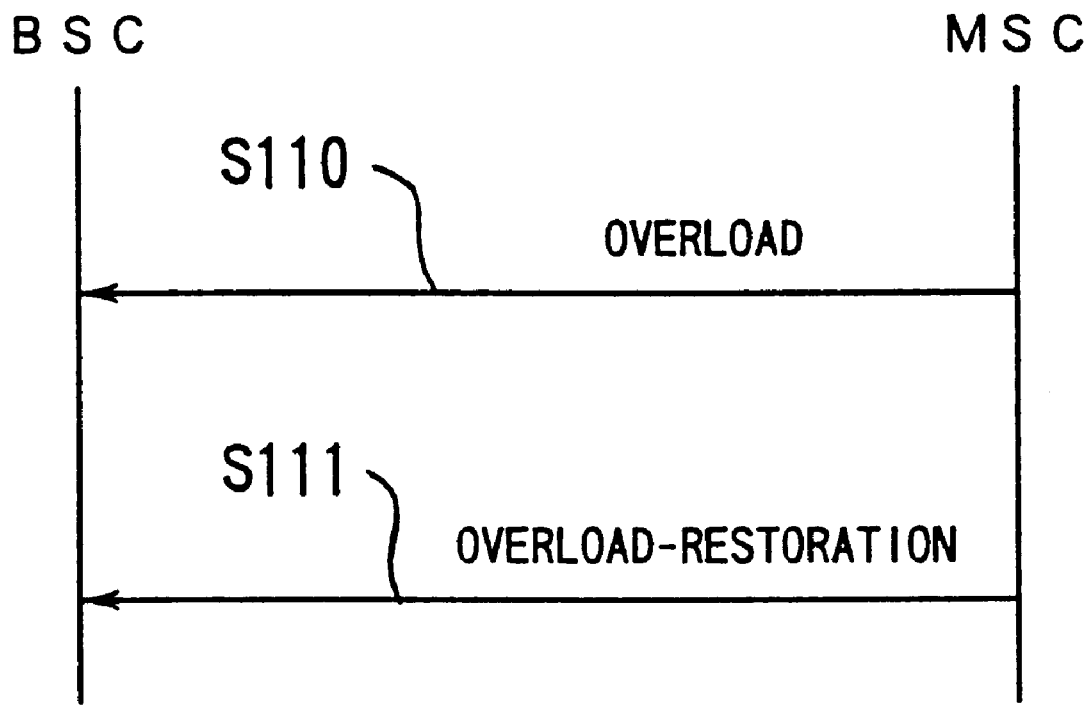
FIG. 33 is an overload control sequence diagram showing interaction between a base station controller and a mobile switching center when clearing the call restriction by using restriction termination messages.
Figure 34:
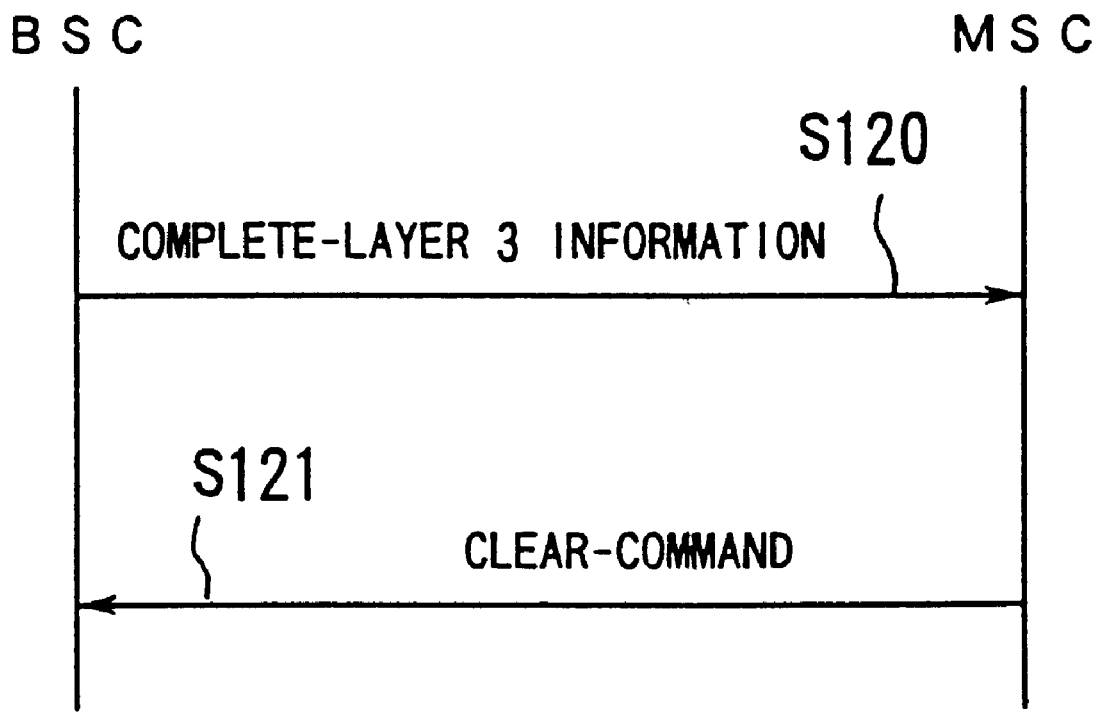
FIG. 34 is an overload control sequence diagram showing interaction between a base station controller and a mobile switching center in the case of performing call restriction by using a "CLEAR COMMAND" message.
Figure 35:
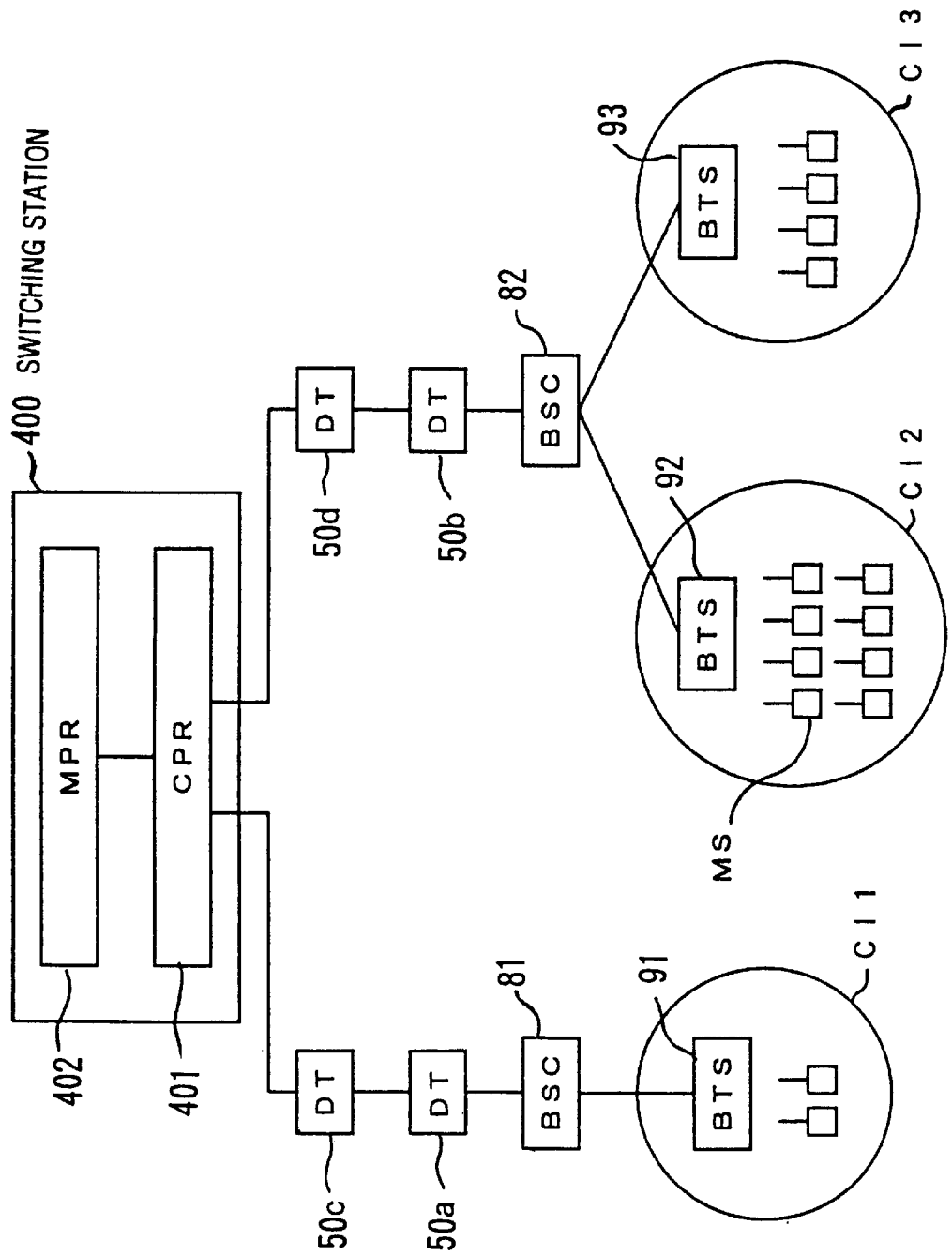
FIG. 35 is a block diagram showing a telecommunications network system where mobile communications networks are connected to a switching station as part of a general public telephone network.
Figure 36:
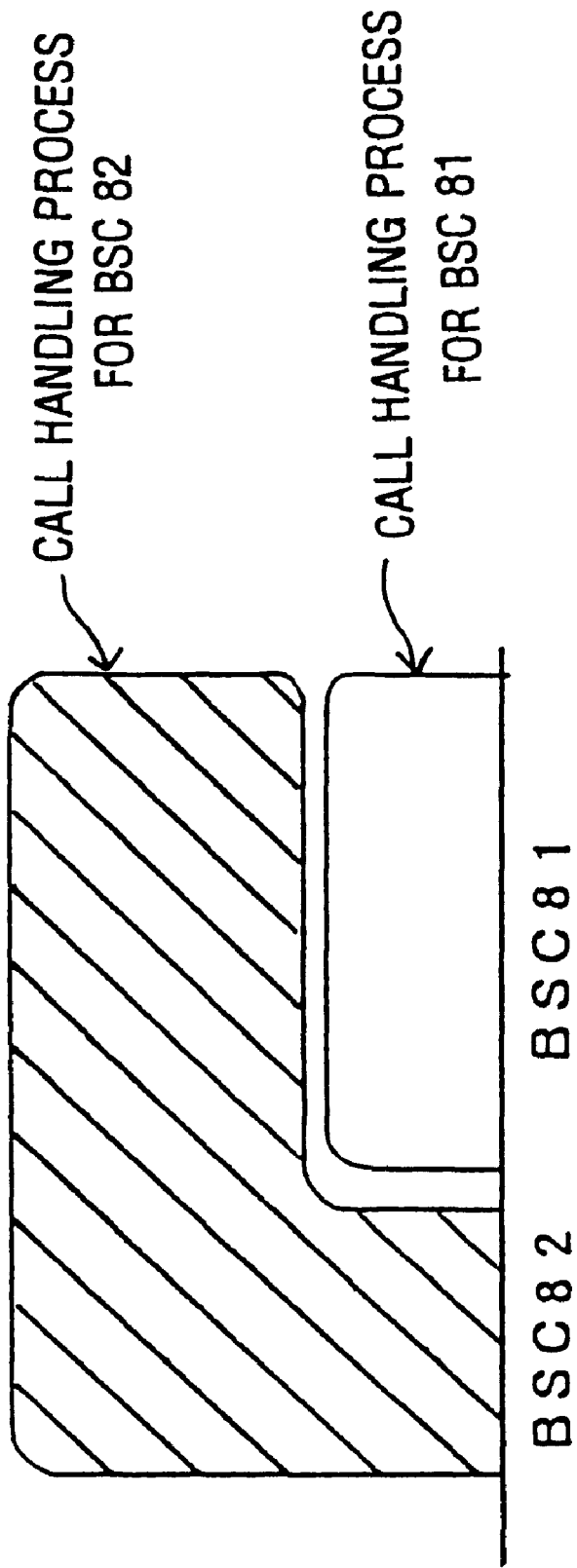
FIG. 36 is a diagram showing call processing load distribution of a call processor.
Figure 37:
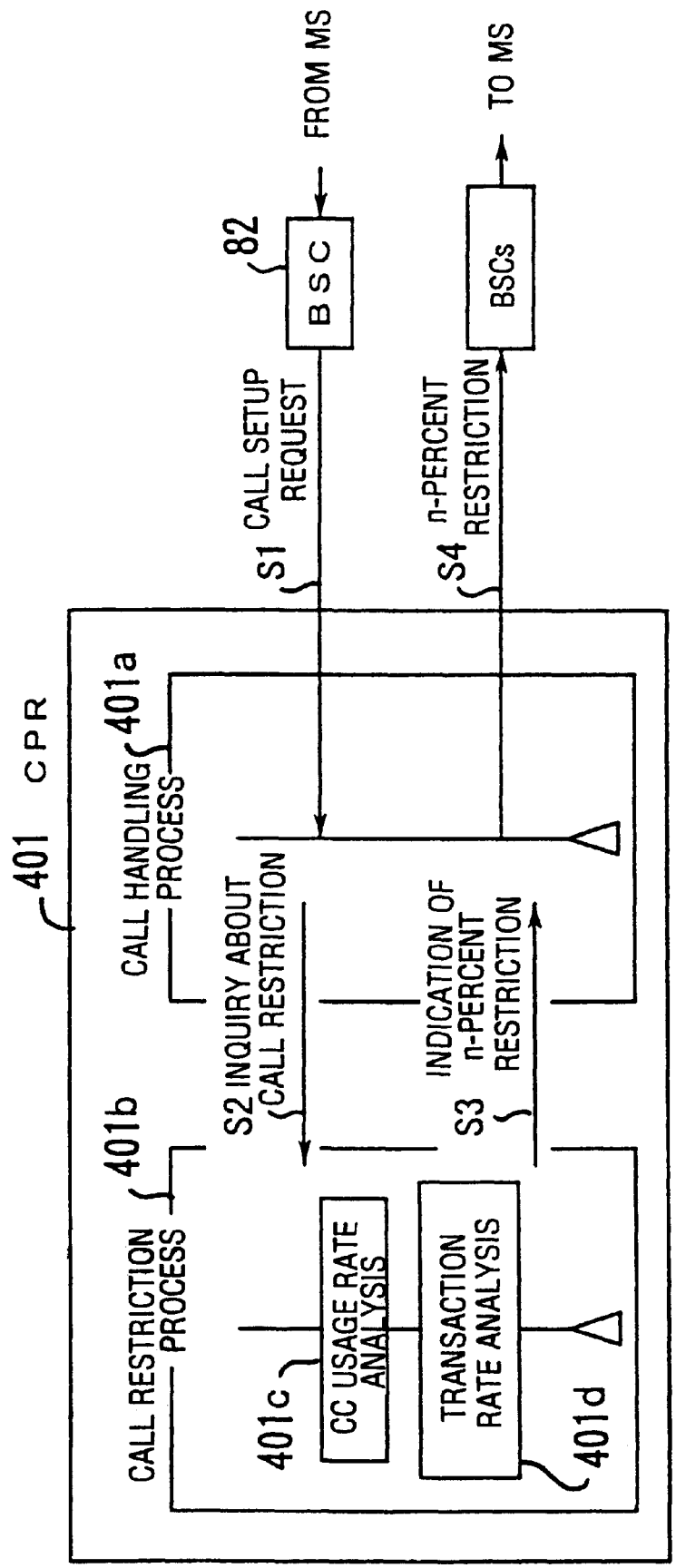
FIG. 37 is a conceptual view of a conventional call restriction method to restrict incoming calls to a telecommunications network system.

FIG. 33 is an overload control sequence diagram showing how a BSC will interact with an MSC when clearing call restriction by using a restriction termination message.

[S110] The BSC receive an "OVERLOAD" message from the MSC.

[S111] Each time it receives the "OVERLOAD" message, the BSC raises the restriction level in a stepwise manner. In turn, each time it receives an "OVERLOAD RESTORATION" message, the BSC reduces the restriction level step by step. Note again that this "OVERLOAD RESTORATION" message is not specified in the GSM recommendation documents but proposed in the present invention.

FIG. 33 is an overload control sequence diagram showing how a BSC will interact with an MSC to perform call restriction by using a clear request message.

[S120] The MSC receives a "COMPLETE LAYER 3 INFORMATION" message from the BSC and recognize the CI number of the cell concerned. This "COMPLETE LAYER 3 INFORMATION" message is a GSM-specified message which serves as the call setup request in the present invention.

[S121] The BSC receives a "CLEAR COMMAND" message from the MSC and disables unused channel resources in the cell. Here, the "CLEAR COMMAND" message is a GSM-specified message which serves as the clear request message in the present invention.

As discussed above, the traffic management system of the present invention can be easily applied to digital mobile communications systems based of the GSM recommendations.

To manage traffic and control congestion, the present invention introduced overload controllers and call restriction processors, presenting various arrangement of them. More specifically, the call restriction processor is disposed at each BTS in the first embodiment, at each BSC in the second embodiment, or at each MSC in the third embodiment. The first and second embodiments also proposed a multiple-level call restriction which can be varied according to the degree of congestion. The third embodiment disables channel resources for call restriction purposes. The combinations of those proposed techniques are, however, not limited to the embodiments shown or described in this specification.

It is also possible to expand the maximum traffic memory block so that it will hold call count information not only for the most congested cell but also for the second and third cells in the high-traffic conditions. This configuration will allow a plurality of cells to be call-restricted when necessary.

Furthermore, the present invention will not be restricted to the use in a mobile communications network but can also be applied to a general digital communications network. In that case, the call restriction processors can be integrated in line processors (LPRs), for example.

In conclusion, the traffic management system of the present invention locates a high-traffic coverage area by using a traffic control memory unit which stores status information of each cell traffic, and applies a call restriction process to a limited base transceiver station. This structural arrangement enables the call restriction to be focused on a particular cell in a high-traffic condition, without affecting the remaining low-traffic cells.

The foregoing is considered as illustrative only of the principles of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A traffic management system with overload control functions, which controls traffic congestion occurred in a telecommunications system having a plurality of coverage areas, the traffic management system comprising:

overload controlling means, responsive to every call setup request, for centrally monitoring traffic conditions in the plurality of coverage areas and controlling congestion occurred therein, the overload controlling means comprising originating call analysis processing means for analyzing the call setup request to locate an originating coverage area where the call setup request was initiated, call-restricted area search processing means for determining whether the originating coverage area should be designated as a call-restricted coverage area or not, the call-restricted coverage area being subject to call restriction, and restriction control message processing means for sending a restriction control message to specify what kind of call restriction operation should be executed to control the originating coverage area when said call-restricted area search processing means has determined the originating coverage area as the call-restricted coverage area; and call restriction processing means for executing, in response to the restriction control message, the specified operation for the call restriction with respect to the call-restricted coverage area.

2. The traffic management system according to claim 1, wherein said call-restricted area search processing means comprises traffic control memory means for storing information about traffic condition of each coverage area, resource monitoring means for monitoring resources necessary for a call handling process, and call-restricted area decision means for searching the information stored in said traffic control memory means to select one of the coverage areas that exhibits the maximum call count, and designating the selected coverage area as the call-restricted coverage area.

3. The traffic management system according to claim 2, wherein said traffic control memory means comprises a plurality of traffic memory blocks each holding a call count in each coverage area, and a maximum traffic memory block holding the maximum call count retrieved from said plurality of traffic memory blocks and also holding an area identification number of the coverage area that exhibits the maximum call count.

4. The traffic management system according to claim 3, wherein said plurality of traffic memory blocks are updated, with respect to the coverage area identified by said originating call analysis processing means, so that the call count will be increased by the number of calls that are newly initiated.

5. The traffic management system according to claim 3, wherein said plurality of traffic memory blocks are updated, with respect to the coverage area identified by said originating call analysis processing means, so that the call count will be decreased by the number of calls that are cleared.

6. The traffic management system according to claim 3, wherein said restriction control message includes a restriction initiation message which requests activation of the call restriction, and said call restriction processing means starts the call restriction upon receipt of the restriction initiation message and terminates the call restriction in an autonomous manner.

7. The traffic management system according to claim 6, wherein the call restriction provides multiple levels of severity, and said call restriction processing means performs the call restriction by activating a call restriction timer upon receipt of the restriction initiation message, raising the severity in a stepwise manner each time the restriction initiation message arrives before the call restriction timer expires, and reducing the severity in a stepwise manner each time the call restriction timer expires.

8. The traffic management system according to claim 1, wherein said restriction control message includes a restriction initiation message and a restriction termination message, and said call restriction processing means activates the call restriction upon receipt of the restriction initiation message and deactivates the call restriction upon receipt of the restriction termination message.

9. The traffic management system according to claim 8, wherein the call restriction provides multiple levels of severity and said call restriction processing means performs the call restriction by raising the severity in a stepwise manner each time the restriction initiation message arrives, and reducing the severity in a stepwise manner each time the restriction termination message arrives.

10. The traffic management system according to claim 1, wherein said restriction control message includes a clear request message, and said call restriction processing means disables communication channels upon receipt of the clear request message.

11. A traffic management system with overload control functions, which controls traffic congestion occurred in a mobile radio communications system having a plurality of radio port coverage areas, the traffic management system comprising:

overload controlling means, responsive to every call setup request, for centrally monitoring traffic conditions in the plurality of radio port coverage areas and controlling congestion occurred therein, the overload controlling means comprising originating call analysis processing means for analyzing the call setup request to locate an originating radio port coverage area where the call setup request was initiated, call-restricted area search processing means for determining whether the originating radio port coverage area should be designated as a call-restricted radio port coverage area or not, the call-restricted radio port coverage area being subject to call restriction, and restriction control message processing means for sending a restriction control message to specify what kind of a call restriction operation should be executed to control the originating radio port coverage area when said call-restricted area search processing means has determined the originating radio port coverage area; and call restriction processing means for executing, in response to the restriction control message, the specified operation for the call restriction with respect to the call-restricted radio port coverage area.

12. The traffic management system according to claim 11, wherein said restriction control message to be sent by said restriction control message processing means includes a restriction initiation message to activate call restriction, a restriction termination message to deactivate the call restriction, and a clear request message to disable communication channels.

13. The traffic management system according to claim 11, wherein each of the plurality of radio port coverage areas comprises a base transceiver station located therein, and said call restriction processing means is disposed in a base station controller which supervises the base transceiver stations to execute the call restriction in one of the plurality of radio port coverage areas.

14. The traffic management system according to claim 11, wherein each of the plurality of radio port coverage areas comprises a base transceiver station located therein, and said call restriction processing means is disposed in the base transceiver station to execute the call restriction within the radio port coverage area under control of the base transceiver station.

15. The traffic management system according to claim 11, wherein said call restriction processing means is implemented as part of a call processor disposed in a switching station and executes the call restriction in one of the plurality of radio port coverage areas.

* * * * *